United States Patent
Tazume

(10) Patent No.: US 12,002,000 B2
(45) Date of Patent: Jun. 4, 2024

(54) DELIVERY METHOD, INFORMATION PROCESSING DEVICE, AND DELIVERY SYSTEM

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 66 days.

(21) Appl. No.: 17/056,174

(22) PCT Filed: Oct. 17, 2018

(86) PCT No.: PCT/JP2018/038699
§ 371 (c)(1),
(2) Date: Nov. 17, 2020

(87) PCT Pub. No.: WO2020/079785
PCT Pub. Date: Apr. 23, 2020

(65) Prior Publication Data
US 2021/0241228 A1 Aug. 5, 2021

(51) Int. Cl.
*G06Q 10/0835* (2023.01)
*B65G 61/00* (2006.01)

(52) U.S. Cl.
CPC ....... *G06Q 10/08355* (2013.01); *B65G 61/00* (2013.01)

(58) Field of Classification Search
None
See application file for complete search history.

(56) References Cited

U.S. PATENT DOCUMENTS

| | | | | |
|---|---|---|---|---|
| 10,303,171 | B1* | 5/2019 | Brady | G05D 1/0278 |
| 11,231,706 | B1* | 1/2022 | Curlander | B25J 5/005 |
| 2018/0260780 | A1 | 9/2018 | Mazetti | |
| 2019/0034877 | A1* | 1/2019 | Cantrell | G05D 1/0297 |
| 2019/0228375 | A1* | 7/2019 | Laury | G05D 1/0088 |
| 2020/0017237 | A1* | 1/2020 | Walker | B64D 45/04 |

FOREIGN PATENT DOCUMENTS

| | | |
|---|---|---|
| GB | 2544657 A | 5/2017 |
| JP | 2014-048047 A | 3/2014 |
| JP | 2018-514478 A | 6/2018 |

OTHER PUBLICATIONS

Arbanas et al.; "Aerial-ground Robotic System for Autonomous Delivery Tasks"; Jun. 9, 2016; IEEE; pp. 5463-5468 (Year: 2016).*
International Search Report for PCT/JP2018/038699, dated Jan. 22, 2019.

* cited by examiner

*Primary Examiner* — Jeff Zimmerman
*Assistant Examiner* — Jorge G Del Toro-Ortega
(74) *Attorney, Agent, or Firm* — Sughrue Mion, PLLC

(57) ABSTRACT

An unmanned aerial delivery vehicle acquires transfer position information indicating a position at time of package transfer of an unmanned ground delivery vehicle that receives a package in a case where a predetermined condition based on position information of the unmanned aerial delivery vehicle that transports a package is satisfied. A position of the unmanned ground delivery vehicle at the time of package transfer is identified by the unmanned aerial delivery vehicle. The unmanned ground delivery vehicle acquires delivery destination information of the package transported by the unmanned aerial delivery vehicle.

14 Claims, 9 Drawing Sheets

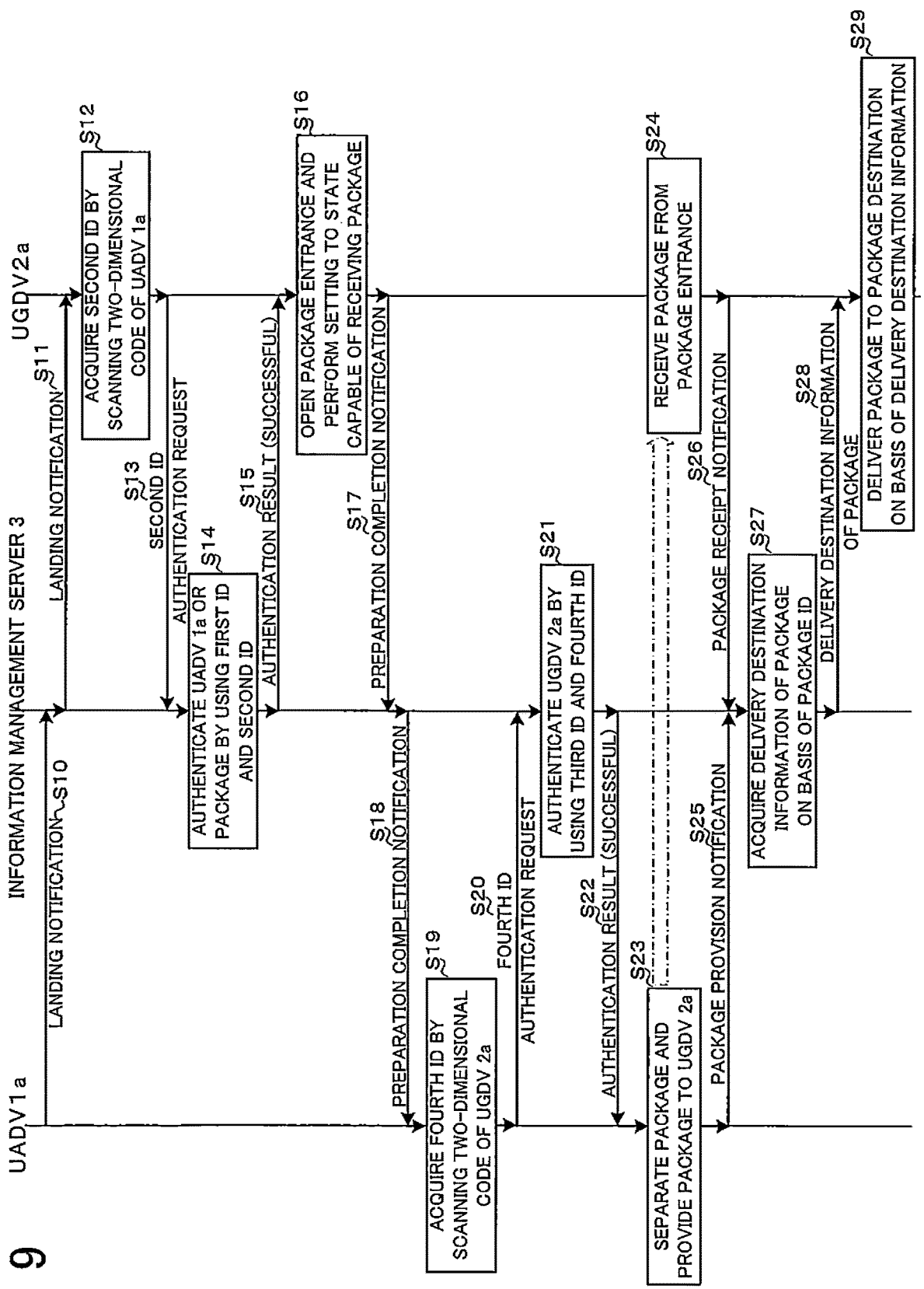

DELIVERY METHOD, INFORMATION PROCESSING DEVICE, AND DELIVERY SYSTEM

CROSS REFERENCE TO RELATED APPLICATIONS

This application is a National Stage of International Application No. PCT/JP2018/038699 filed Oct. 17, 2018.

TECHNICAL FIELD

The present invention relates to a field of a delivery method and the like by which a package is delivered to a delivery destination by unmanned delivery.

BACKGROUND ART

In recent years, an unmanned delivery system using an unmanned aerial delivery vehicle or an unmanned ground delivery vehicle has been studied (for example, Patent Literature 1). The unmanned aerial delivery vehicle can fly without being affected by road conditions on the ground, and the like, but places where the unmanned aerial delivery vehicle can land are limited. Therefore, it is often difficult to transport a package to a final delivery destination (e.g., each home). On the other hand, the unmanned ground delivery vehicle tends to be affected by the road conditions on the ground, and the like, but can transport the package closer to a delivery destination.

CITATION LIST

Patent Literature

Patent Literature 1: JP 2018-514478 A

SUMMARY OF INVENTION

Technical Problem

Considering situations as described above, in a future unmanned delivery system, it is conceivable that a package is transported by an unmanned aerial delivery vehicle to a near area of a delivery destination, then the package is transferred to an unmanned ground delivery vehicle from the unmanned aerial delivery vehicle, and the unmanned ground delivery vehicle delivers the package to the delivery destination. However, under the present situations, there is no structural system provided for linking an unmanned aerial delivery vehicle and an unmanned ground delivery vehicle. Therefore, in a conventional unmanned delivery system, an unmanned aerial delivery vehicle that transports a package cannot identify a position on the ground of an unmanned ground delivery vehicle to which the package is to be passed. Also, the unmanned ground delivery vehicle to which the package has been passed from the unmanned aerial delivery vehicle cannot acquire delivery destination information to deliver the package.

Therefore, one or more embodiments of the present invention are directed to provide a delivery method, an information processing device, and a delivery system that enables an unmanned aerial delivery vehicle to pass a package to an unmanned ground delivery vehicle and also enables the unmanned ground delivery vehicle to deliver the passed package closer to a delivery destination.

Solution to Problem

In response to the above issue, and according to an aspect of the disclosure, a delivery method executed by a delivery system including an unmanned aerial delivery vehicle and an unmanned ground delivery vehicle is provided. The delivery method includes: a first acquisition step of the unmanned aerial delivery vehicle acquiring transfer position information indicating a position at time of package transfer of the unmanned ground delivery vehicle that receives a package in a case where a predetermined condition based on position information of the unmanned aerial delivery vehicle that transports the package is satisfied; and a second acquisition step of the unmanned ground delivery vehicle acquiring delivery destination information to deliver the package received by the unmanned ground delivery vehicle from the unmanned aerial delivery vehicle, in which the position of the unmanned ground delivery vehicle at the time of package transfer is identified by the unmanned aerial delivery vehicle. Accordingly, the unmanned aerial delivery vehicle can pass the package to the unmanned ground delivery vehicle, and the unmanned ground delivery vehicle can also deliver the passed package closer to a delivery destination.

The delivery method may further include a step of delivering the package to a delivery destination by the unmanned ground delivery vehicle autonomously moving on the basis of the delivery destination information of the package. This enables the unmanned ground delivery vehicle to automatically deliver the package to the delivery destination without human intervention.

In a case where the predetermined condition is satisfied by the unmanned aerial delivery vehicle arriving at a delivery area including the delivery destination of the package, the unmanned aerial delivery vehicle may acquire the transfer position information. This enables the unmanned aerial delivery vehicle to acquire the transfer position information at appropriate timing.

The delivery system may further include a first information processing unit which manages the transfer position information. The delivery method may further include a first transmission step of the first information processing unit transmitting the transfer position information to the unmanned aerial delivery vehicle, and the unmanned aerial delivery vehicle may acquire the transfer position information transmitted by the first information processing unit. This enables the unmanned aerial delivery vehicle to acquire transfer position information at appropriate timing.

The delivery method may further include a selection step of the first information processing unit selecting, from among a plurality of the unmanned ground delivery vehicles, one unmanned ground delivery vehicle available for use. The first information processing unit may transmit transfer position information to the unmanned aerial delivery vehicle. The transfer position information may indicate a position at the time of package transfer of the unmanned ground delivery vehicle. This makes it possible to efficiently use a plurality of unmanned ground delivery vehicles for package delivery.

In a case where it is determined that the unmanned aerial delivery vehicle has arrived at a delivery area including a delivery destination of the package, the first information processing unit may select the unmanned ground delivery vehicle. This makes it possible to select one unmanned ground delivery vehicle from among a plurality of unmanned ground delivery vehicles immediately before ground delivery of the package, and to more efficiently use the unmanned ground delivery vehicle for package delivery.

In a case where it is determined that the package is received from the unmanned aerial delivery vehicle, the unmanned ground delivery vehicle may acquire the delivery destination information of the package. This makes it possible to prevent the delivery destination information of the package from being provided carelessly to the outside, and to improve safety in package delivery.

In a case where weight of the package is sensed, the unmanned ground delivery vehicle may determine that the package is received. This makes it possible to secure sureness of package receipt, and to further improve safety in package delivery.

The delivery system may further include a second information processing unit which manages the delivery destination information of the package. The delivery method may further include a second transmission step of the second information processing unit transmitting the delivery destination information of the package to the unmanned ground delivery vehicle, and the unmanned ground delivery vehicle may acquire the delivery destination information of the package transmitted from the second information processing unit. This enables the unmanned ground delivery vehicle to acquire the delivery destination information at appropriate timing.

The delivery method may further include a step of transmitting, to the second information processing unit, package receipt information indicating that the package is received in a case where it is determined that the unmanned ground delivery vehicle has received the package from the unmanned aerial delivery vehicle. The second information processing unit may transmit the delivery destination information of the package to the unmanned ground delivery vehicle in a case where the package receipt information is received from the unmanned ground delivery vehicle. This makes it possible to prevent the delivery destination information of the package from being provided carelessly to the outside, and to improve safety in package delivery.

The unmanned ground delivery vehicle may acquire the delivery destination information of the package from the unmanned aerial delivery vehicle or the package mounted on the unmanned aerial delivery vehicle. This enables the unmanned ground delivery vehicle to quickly acquire the delivery destination information.

The delivery system may further include a third information processing unit which manages, as first identification information, identification information of the unmanned aerial delivery vehicle or identification information of the package mounted on the unmanned aerial delivery vehicle. The delivery method may further include: a third acquisition step of the unmanned ground delivery vehicle acquiring second identification information from the unmanned aerial delivery vehicle having landed on the unmanned ground delivery vehicle or the package mounted on the unmanned aerial delivery vehicle; a step of the unmanned ground delivery vehicle transmitting, to the third information processing unit, the second identification information acquired from the unmanned aerial delivery vehicle or the package; a step of authenticating the unmanned aerial delivery vehicle or the package by using the first identification information managed by the third information processing unit and the second identification information received from the unmanned ground delivery vehicle; a step of transmitting authentication success information to the unmanned ground delivery vehicle in a case where the third information processing unit may determine that authentication is successful in authenticating the unmanned aerial delivery vehicle or the package; and a step of performing setting to a state capable of receiving the package from the unmanned aerial delivery vehicle in a case where the unmanned ground delivery vehicle receives the authentication success information from the third information processing unit. This makes it possible to improve safety in package delivery.

The third information processing unit may further manage, as third identification information, identification information of the unmanned ground delivery vehicle. The delivery method may further include: a step of transmitting preparation completion information to the third information processing unit in a case where the unmanned ground delivery vehicle performs the setting to the state capable of receiving the package; a step of transmitting, to the unmanned aerial delivery vehicle, the preparation completion information received from the unmanned ground delivery vehicle by the third information processing unit; a step of acquiring fourth identification information from the unmanned ground delivery vehicle on which the unmanned aerial delivery vehicle has landed in a case where the unmanned aerial delivery vehicle receives the preparation completion information from the third information processing unit; a step of the unmanned aerial delivery vehicle transmitting, to the third information processing unit, the fourth identification information acquired from the unmanned ground delivery vehicle; a step of authenticating the unmanned ground delivery vehicle by using the third identification information managed by the third information processing unit and the fourth identification information received from the unmanned aerial delivery vehicle; a step of transmitting authentication success information to the unmanned aerial delivery vehicle in a case where the third information processing unit determines that authentication is successful in authenticating the unmanned ground delivery vehicle; and a step of providing the package to the unmanned ground delivery vehicle in a case where the unmanned aerial delivery vehicle receives the authentication success information from the third information processing unit. This makes it possible to further improve safety in package delivery.

The third information processing unit may further manage, as third identification information, identification information of the unmanned ground delivery vehicle. The delivery method may further include: a step of acquiring fourth identification information from the unmanned ground delivery vehicle on which the unmanned aerial delivery vehicle has landed; a step of the unmanned aerial delivery vehicle transmitting, to the third information processing unit, the fourth identification information acquired from the unmanned ground delivery vehicle; a step of authenticating the unmanned ground delivery vehicle by using the third identification information managed by the third information processing unit and the fourth identification information received from the unmanned aerial delivery vehicle; a step of transmitting authentication success information to the unmanned aerial delivery vehicle in a case where the third information processing unit determines that authentication is successful in authenticating the unmanned ground delivery vehicle; and a step of performing setting to a state capable of providing the package to the unmanned ground delivery vehicle in a case where the unmanned aerial delivery vehicle receives the authentication success information from the third information processing unit. This makes it possible to improve safety in package delivery.

The delivery method may further include: a step of the third information processing unit receiving landing information from the unmanned aerial delivery vehicle that has landed on the unmanned ground delivery vehicle, the landing information indicating that the unmanned aerial delivery vehicle has landed; and a step of the third information processing unit transmitting, to the unmanned ground delivery vehicle, the landing information received from the unmanned aerial delivery vehicle. The unmanned ground delivery vehicle may acquire the second identification information from the unmanned aerial delivery vehicle or the package in a case where the unmanned ground delivery vehicle receives the landing information from the third information processing unit. This enables the unmanned ground delivery vehicle to surely acquire the identification information of the unmanned aerial delivery vehicle or the identification information of the package when the unmanned aerial delivery vehicle surely lands.

The unmanned ground delivery vehicle may be placed in a predetermined delivery vehicle parking place. The delivery method may further include a step of the unmanned ground delivery vehicle moving to a position at the time of package transfer in a case where the predetermined condition based on position information of the unmanned aerial delivery vehicle is satisfied. This makes it possible to more efficiently use the unmanned ground delivery vehicle for package delivery.

According to another aspect of the disclosure, an information processing device in a delivery system including an unmanned aerial delivery vehicle, an unmanned ground delivery vehicle, and the information processing device is provided. The information processing device includes: a first transmission unit which transmits, to the unmanned aerial delivery vehicle, transfer position information indicating a position at time of package transfer of the unmanned ground delivery vehicle that receives a package in a case where a predetermined condition based on position information of the unmanned aerial delivery vehicle that transports the package is satisfied; and a second transmission unit which transmits, to the unmanned ground delivery vehicle, delivery destination information received by the unmanned ground delivery vehicle from the unmanned aerial delivery vehicle to deliver the package, in which the position at the time of package transfer of the unmanned ground delivery vehicle is identified by the unmanned aerial delivery vehicle. Accordingly, the unmanned aerial delivery vehicle can pass the package to the unmanned ground delivery vehicle, and the unmanned ground delivery vehicle can also deliver the passed package closer to a delivery destination.

The information processing device may further include a selection unit which selects, from among a plurality of the unmanned ground delivery vehicles, one unmanned ground delivery vehicle available for use. The first transmission unit may transmit, to the unmanned aerial delivery vehicle, transfer position information indicating a position at the time of package transfer of the ground delivery vehicle selected by the selection unit. This makes it possible to more efficiently use a plurality of the unmanned ground delivery vehicle for package delivery.

The selection unit may select the unmanned ground delivery vehicle in a case where it is determined that the unmanned aerial delivery vehicle has arrived at a delivery area including a delivery destination of the package. This makes it possible to select one unmanned ground delivery vehicle from among a plurality of unmanned ground delivery vehicles immediately before ground delivery of the package, and to more efficiently use the unmanned ground delivery vehicle for package delivery.

The selection unit may preferentially select, from among the plurality of unmanned ground delivery vehicles, the unmanned ground delivery vehicle exclusive for a building that is a delivery destination indicated by the delivery destination information of the package. This makes it possible to more quickly deliver the package to the delivery destination.

The selection unit may preferentially select, from among the plurality of unmanned ground delivery vehicles, the unmanned ground delivery vehicle whose current position is relatively close to the position at the time of package transfer. This makes it possible to more quickly deliver the package to the delivery destination.

The information processing device may manage the delivery destination information of each of a plurality of the packages transported by one or a plurality of the unmanned aerial delivery vehicles, and in a case where respective delivery destinations of the plurality of packages are in a same delivery area, the selection unit may select one unmanned ground delivery vehicle capable of loading the plurality of packages. This makes it possible to reduce power consumption or fuel consumption of the unmanned ground delivery vehicle.

The information processing device may further include a first reception unit which receives package receipt information indicating that the package is received from the unmanned ground delivery vehicle. The second transmission unit may transmit the delivery destination information of the package to the unmanned ground delivery vehicle in a case where the package receipt information is received by the first reception unit. This makes it possible to prevent the delivery destination information of the package from being provided carelessly to the outside, and to improve safety in package delivery.

The information processing device may manage, as first identification information, identification information of the unmanned aerial delivery vehicle or identification information of the package mounted on the unmanned aerial delivery vehicle. The information processing device may further include: a second reception unit which receives, from the unmanned ground delivery vehicle, second identification information acquired by the unmanned ground delivery vehicle from the unmanned aerial delivery vehicle or the package; a first authentication unit which authenticates the unmanned aerial delivery vehicle or the package by using the first identification information and the second identification information received by the second reception unit; and a third transmission unit which transmits, to the unmanned ground delivery vehicle, control information that sets the unmanned ground delivery vehicle to a state capable of receiving the package in a case where the authentication is determined as successful by the first authentication unit. This makes it possible to improve safety in package delivery.

The information processing device may be configured to manage, as third identification information, identification information of the unmanned ground delivery vehicle. The information processing device may further include: a third reception unit which receives, from the unmanned aerial delivery vehicle, fourth identification information acquired from the unmanned ground delivery vehicle by the unmanned aerial delivery vehicle; a second authentication unit which authenticates the unmanned ground delivery vehicle by using the third identification information and the fourth identification information received by the third reception unit; and a fourth transmission unit which transmits, to the unmanned aerial delivery vehicle, control information to provide the package to the unmanned ground delivery vehicle in a case where the authentication is determined as successful by the second authentication unit. This makes it possible to improve safety in package delivery.

According to another aspect of the disclosure, a delivery system is provided, comprising an unmanned aerial delivery vehicle, an unmanned ground delivery vehicle, and an information processing device. The information processing device includes a transmission unit which transmits, to the unmanned aerial delivery vehicle, transfer position information indicating a position at time of package transfer of the unmanned ground delivery vehicle that receives a package in a case where a predetermined condition based on position information of the unmanned aerial delivery vehicle that transports the package is satisfied. The unmanned aerial delivery vehicle includes: a reception unit which receives the transfer position information transmitted from the information processing device; and an identification unit which identifies, on the basis of the transfer position information, a position of the unmanned ground delivery vehicle at the time of package transfer, and the unmanned ground delivery vehicle includes an acquisition unit which acquires delivery destination information to deliver the package received from the unmanned aerial delivery vehicle.

Advantageous Effect of the Invention

According to one or more embodiments of the present invention, the unmanned aerial delivery vehicle can pass the package to the unmanned ground delivery vehicle, and the unmanned ground delivery vehicle can also deliver the passed package closer to a delivery destination.

BRIEF DESCRIPTION OF THE DRAWINGS

FIG. 9 is a sequence diagram illustrating an exemplary operation of a delivery system S from when an UADV 1 lands on an UGDV 2 until the UGDV 2 delivers a package to a delivery destination.

DESCRIPTION OF EMBODIMENTS

Hereinafter, a delivery system according to an embodiment of the present invention, and an embodiment of a delivery method executed by the delivery system will be described with reference to the drawings.

[1. Outline of Configuration and Functions of Delivery System S]

Figure 1:
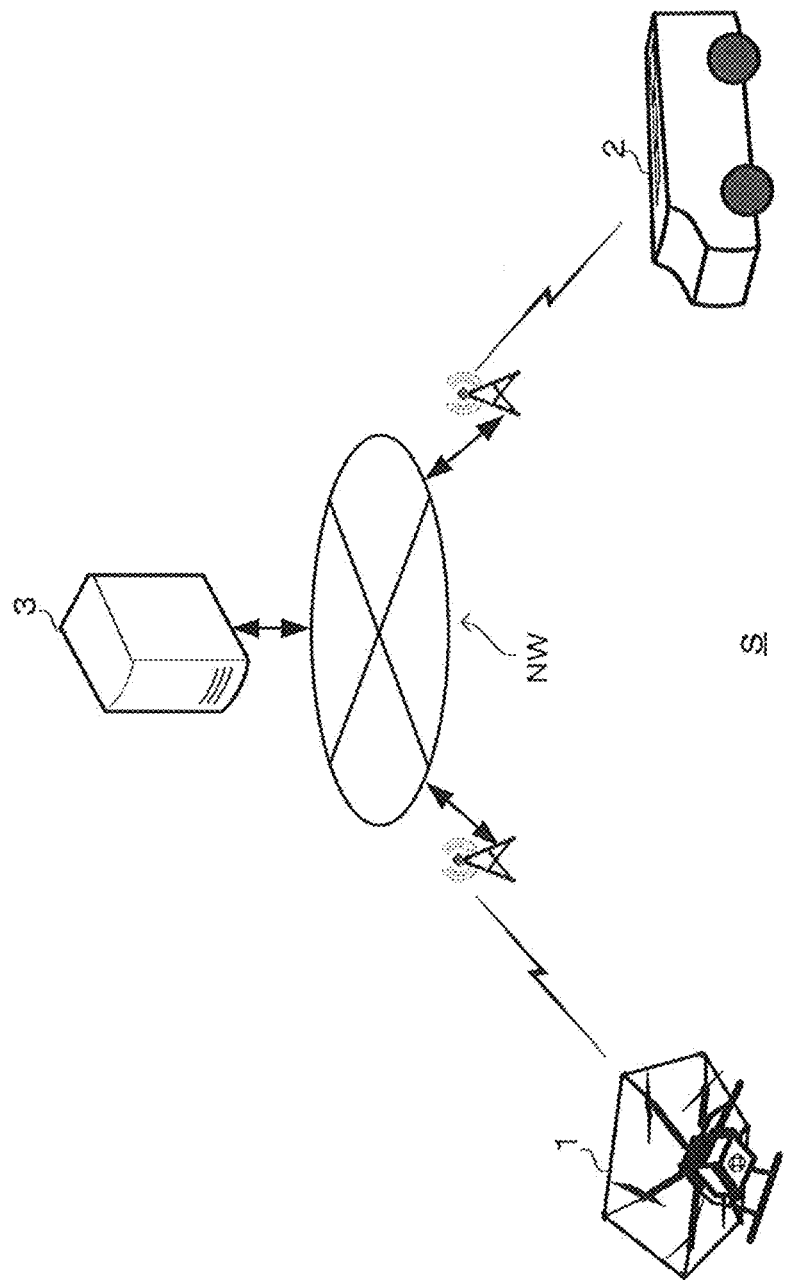
FIG. 1 is a diagram illustrating a schematic configuration example of the delivery system S.

First, an outline of a configuration and functions of a delivery system S according to the present embodiment will be described with reference to FIG. 1. FIG. 1 is a view illustrating a schematic configuration example of the delivery system S. As illustrated in FIG. 1, the delivery system S includes: an unmanned aerial delivery vehicle that flies in the atmosphere (hereinafter, referred to as "UADV (Unmanned Aerial Delivery Vehicle)" 1); an unmanned ground delivery vehicle (referred to as an "UGDV (Unmanned Ground Delivery Vehicle)" 2); and an information management server 3 that manages information related to delivery. Each of the UADV 1 and the UGDV 2 can communicate with the information management server 3 via a communication network NW. The communication network NW includes, for example, a mobile communication network, a radio base station thereof, and the like. Radio communication is performed between the radio base station and the UADV 1 and between the radio base station and the UGDV 2.

Incidentally, one UADV 1 and one UGDV 2 are illustrated in the example of FIG. 1, but there is an assumed case of having a plurality of UADVs 1 (1a, 1b, 1c, . . . ) and a plurality of UGDVs 2 (2a, 2b, 2c, . . . ) in the following description. The UADV 1 illustrated in FIG. 1 is also called a drone or a multi-copter. The UGDV 2 illustrated in FIG. 1 illustrates an unmanned ground car having a plurality of wheels, but the UGDV 2 may be a robot having no wheel (e.g., a bipedal walking robot). The information management server 3 is an example of an information processing device. In the example of FIG. 1, it is assumed that the information management server 3 is installed in a manner fixed independently of the UADV 1 and the UGDV 2, but all or part of functions of the information management server 3 may be provided in both or one of the UADV 1 and the UGDV 2. In this case, all or the part of processing (respective steps in a delivery method) performed by the information management server 3 is performed by both or one of the UADV 1 and the UGDV 2.

In the delivery method executed by such a delivery system S, in a case where a predetermined condition based on position information of the UADV 1 is satisfied, the UADV 1 that transports a package acquires transfer position information indicating a position of the UGDV 2 at the time of package transfer. The UGDV 2, whose position at the time of package transfer by the UADV 1 is identified, acquires delivery destination information to deliver the package received from the UADV 1. By this configuration, linkage between the UADV 1 and the UGDV 2 is accomplished, the UADV 1 can pass the package to the UGDV 2 and also can deliver, to the delivery destination, the package that has been passed to the UGDV 2. Incidentally, in the following description, the "delivery destination information to deliver a package" will be referred to as "delivery destination information of a/the package".

Here, the position information of the UADV 1 indicates a current position (for example, latitude, longitude, and altitude) of the UADV 1. The current position of the UADV 1 is a flight position of the UADV 1 in flight. As an example of the predetermined condition based on the position information of the UADV 1, a condition that the current position of the UADV 1 has reached a delivery area including a delivery destination of a package is set. In the delivery area, a takeoff and landing facility (hereinafter referred to as a "port") where the UADV 1 that transports the package is to land is installed. The port is used as a transfer place of the package transported by the UADV 1. The position of the UGDV 2 at the time of package transfer is a position on the port. Moreover, a delivery vehicle parking place (UGDV 2 waiting station) where one or a plurality of UGDVs 2 is placed is installed in the delivery area. Incidentally, the delivery area may have various sizes. For example, in a case where the delivery area is a large area like a residential area where a plurality of buildings is clustered together, a plurality of ports may be installed in the delivery area.

Since the UADV 1 identifies a position of the UGDV 2 at the time of package transfer on the basis of the transfer position information, the UADV 1 lands on the UGDV 2 present at the position and transfers (that is, provides) the package to the UGDV 2. That is, the UGDV 2 receives the package from the UADV 1 that has landed. With this configuration, the package is passed from the UADV 1 to the UGDV 2. Then, the UGDV 2 delivers the package to the delivery destination by autonomously moving on the ground on the basis of the delivery destination information of the package that has been passed. According to this configuration, the UGDV 2 can automatically deliver (send) the package to the delivery destination without human intervention. The delivery destination information of the package may include, for example, latitude and longitude of a delivery destination or an address of the delivery destination. The delivery destination may be an entrance of a residence or an office of a consignee, or a delivery box (storage box for temporary storage of the package) installed in a place away from the entrance of the residence or the office of the consignee. Alternatively, the delivery destination may be the consignee himself/herself. In this case, for example, it is assumed that the consignee comes out of a building where the residence or the office is located, and have the consignee receive the package from the UGDV 2. In a case where the delivery destination is one room (one home) in a building such as an apartment building or an office building, the delivery destination information preferably includes a name of the building and a room number of the room that is to be the delivery destination.

Incidentally, the UADV 1 preferably acquires the transfer position information from the information management server 3 via the communication network NW. However, the UADV 1 may also acquire the transfer position information from a GCS (Ground Control Station) that can manage and remotely control the UADV 1 from the ground. In this case, the GCS acquires the transfer position information from the information management server 3 in advance. For example, the GCS may be installed in a control terminal that can be connected to the communication network NW as an application or may be systemized by a server or the like. In a case where the area of a port is equal to or larger than a threshold (for example, in a case where a plurality of UGDVs 2 can stop at the port), a position of the UGDV 2 at the time of package transfer is desirably detected by the UGDV 2 when the UGDV 2 arrives at the port to be the transfer place of the package. In this case, the transfer position information indicating the detected position is transmitted from the UGDV 2 to the information management server 3. However, in a case where the area of the port is smaller than the threshold (for example, in a case where only one UGDV 2 can stop at the port), an installation position of the port determined as the transfer place of the package by the information management server 3 may be determined as a position of the UGDV 2 at the time of package transfer.

Moreover, the UGDV 2 preferably acquires, from the information management server 3 via the communication network NW, the delivery destination information of the package transported by the UADV 1. However, the UGDV 2 may acquire the delivery destination information from the UADV 1 that has landed or the package mounted on the UADV 1. In this case, for example, a two-dimensional code (for example, a QR code (registered trademark)) including the delivery destination information of the package is displayed (for example, by sticking, printing, or the like) at a lower portion of the UADV 1 or the package. By this display, the UGDV 2 can acquire the delivery destination information of the package by scanning (reading) the two-dimensional code. Alternatively, an IC tag storing the delivery destination information of the package may be attached to the lower portion of the UADV 1 or the package. By this IC tag, the UGDV 2 can acquire the delivery destination information of the package from the IC tag without contact. Alternatively, in a case where the UADV 1 and the UGDV 2 have a near field communication function such as Bluetooth (registered trademark), the UGDV 2 may acquire the delivery destination information stored in the UADV 1 via the near field communication.

Figure 2:
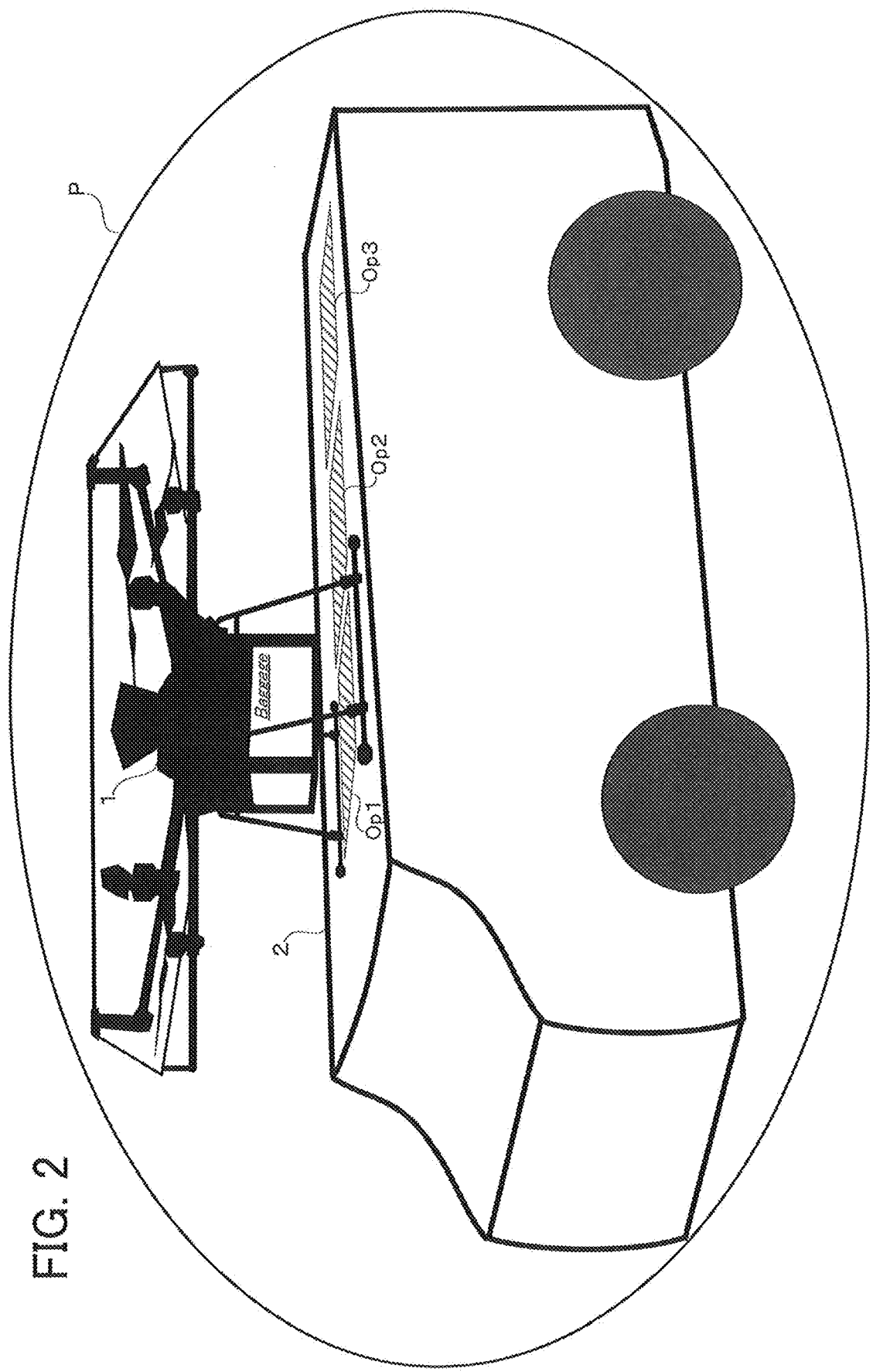
FIG. 2 is a view illustrating a state in which an UADV 1 lands on an UGDV 2 at a port P.

FIG. 2 is a view illustrating a state in which a UADV 1 lands on a UGDV 2 at a port P. Three package entrances Op1 to Op3 are provided at an upper portion of the UGDV 2 illustrated in FIG. 2, and a package (baggage) can be carried in from each of the package entrances Op1 to Op3. In the example of FIG. 2, when the package (baggage) held by the UADV 1 is separated after the package entrance Op1 of the UGDV 2 is opened, the package is carried in from the package entrance Op1. That is, the UGDV 2 receives the package from the UADV 1. According to this configuration, the package can be automatically transferred from the UADV 1 to the UGDV 2 without human intervention. Incidentally, safety in package delivery can be improved by transferring the package after performing authentication on whether or not the UADV 1 and the UGDV 2 are the vehicles correct to each other. In this case, a two-dimensional code including a vehicle ID (identification information) identifying the UADV 1 is displayed at the lower portion of the UADV 1 for authentication, and a two-dimensional code including a vehicle ID identifying the UGDV 2 is displayed at the upper portion of the UGDV 2 for authentication. Alternatively, a two-dimensional code including a package ID identifying the package may be displayed at the lower portion of the package for authentication in order to authenticate the package instead of the UADV 1. Moreover, in a case where a package is a product ordered by a purchaser, the package ID may be an order ID identifying the product order.

[1-1. Outline of Configuration and Functions of UADV 1]

Figure 3:
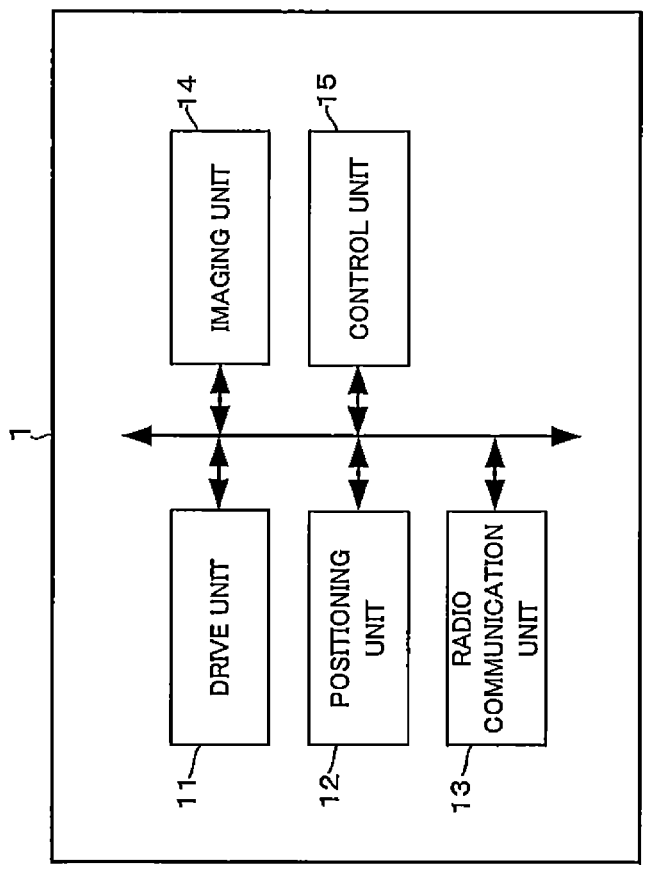
FIG. 3 is a diagram illustrating a schematic configuration example of an UADV 1.

Next, an outline of a configuration and functions of a UADV 1 will be described with reference to FIG. 3. FIG. 3 is a diagram illustrating a schematic configuration example of the UADV 1. As illustrated in FIG. 3, the UADV 1 includes a drive unit 11, a positioning unit 12, a radio communication unit 13, an imaging unit 14, a control unit 15, and the like. Incidentally, the UADV 1 includes, although not illustrated, a rotor (propeller) that is a horizontal rotary blade, various sensors, a package holding mechanism, a battery that supplies power to each of the units of the UADV 1, and the like. The various sensors used for flight control of the UADV 1 include a barometric sensor, a three-axis acceleration sensor, a geomagnetic sensor, and the like. Detection information detected by the various sensors is output to the control unit 15. The detection information detected by the barometric sensor is used to calculate a flight speed of the UADV 1.

The drive unit 11 includes a motor, a rotating shaft, and the like. The drive unit 11 rotates a plurality of rotors by a motor, a rotating shaft, and the like that are driven in accordance with a control signal output from the control unit 15. The positioning unit 12 includes a radio wave receiver, an altitude sensor, and the like. For example, the positioning unit 12 receives, by the radio wave receiver, a radio wave sent from a satellite of a GNSS (Global Navigation Satellite System) and detects a current position in a horizontal direction (latitude and longitude) of the UADV 1 on the basis of the radio wave. Incidentally, the current position in the horizontal direction of the UADV 1 may be corrected on the basis of an image captured by the imaging unit 14 or a radio wave sent from the radio base station. Furthermore, the positioning unit 12 may detect the current position (altitude) in a vertical direction of the UADV 1 with the altitude sensor. The position information indicating the current position detected by the positioning unit 12 is output to the control unit 15. Incidentally, the position information of the UADV 1 can be applied to the present embodiment even in a case where the position information indicates the current position (latitude and longitude) in the horizontal direction of the UADV 1 (that is, two-dimensional position information).

The radio communication unit 13 controls communication performed via the communication network NW. The imaging unit 14 includes a camera and the like. The imaging unit 14 continuously captures images of a real space within a range included in an angle of view of the camera (a periphery of the UADV 1). Image information captured by the imaging unit 14 is output to the control unit 15. Moreover, in a case where authentication is performed before package transfer, the two-dimensional code displayed on the upper portion of the UGDV 2 is scanned by the imaging unit 14 and output to the control unit 15.

The control unit 15 includes a central processing unit (CPU) which is a processor, a read only memory (ROM), a random access memory (RAM), a non-volatile memory, and the like. Incidentally, the control unit 15 is an example of a reception unit and an identification unit. The control unit 15 executes various kinds of control for the UADV 1 in accordance with a control program (program code group) stored in, for example, the ROM or the non-volatile memory. The various kinds of control include take-off control, flight control, landing control, and package providing control. In the flight control and the landing control, the position information acquired from the positioning unit 12, the image information acquired from the imaging unit 14, the detection information acquired from the various sensors, the transfer position information acquired from the information management server 3 and the like, and pre-registered flight plan information are used to control a rotation speed of the rotor, a position, a posture, and an advancing direction of the UADV 1. By this configuration, the UADV 1 can fly autonomously from a departure place to a port. Incidentally, the control unit 15 can also perform the flight control in accordance with an instruction signal from a control terminal operated by an operator. On the other hand, in the package providing control, control is performed to separate the package held by the package holding mechanism (that is, provide the package). With this configuration, the package is transferred from UADV 1 to UGDV 2.

Moreover, in a case where the predetermined condition based on the position information of the UADV 1 that transports the package is satisfied, the control unit 15 acquires, from the information management server 3 or the GCS, the transfer position information indicating a position of the UGDV 2 at the time of package transfer. According to this configuration, the UADV 1 can acquire the transfer position information at appropriate timing. For example, in a case where it is determined that the UADV 1 that transports the package has arrived at a delivery area including a delivery destination of the package (arrival determination), the control unit 15 preferably acquires the transfer position information. This arrival determination may be made by the UADV 1 or may be made by the information management server 3. In the former case, the control unit 15 determines whether or not the current position detected by the positioning unit 12 has entered the delivery area. In a case where the current position detected by the positioning unit 12 has entered the delivery area, the control unit 15 determines that the UADV 1 has arrived at the delivery area and transmits, to the information management server 3, arrival information indicating that the UADV 1 has arrived. Then, the control unit 15 acquires the transfer position information transmitted from the information management server 3 in response to the arrival information, and identifies a position of the UGDV 2 at the time of package transfer on the basis of the transfer position information.

Incidentally, as the predetermined condition based on the position information of the UADV 1, a condition that the time has reached a predetermined period before scheduled arrival time of the UADV 1 at the delivery area (for example, 5 minutes before) may be set. In this case, in a case of determining that the time has reached the predetermined period before the scheduled arrival time of the UADV 1 at the delivery area, the control unit 15 transmits, to the information management server 3, arrival information indicating the scheduled arrival of the UADV 1. Then, the control unit 15 acquires the transfer position information transmitted from the information management server 3 in response to the arrival information, and identifies a position of the UGDV 2 at the time of package transfer on the basis of the transfer position information. The scheduled arrival time of the UADV 1 at the delivery area is calculated from, for example, a distance from the current position of UADV 1 to the delivery area and an average flight speed of the UADV 1.

Moreover, in a case where the authentication is performed before the package transfer, the control unit 15 acquires the vehicle ID of the UGDV 2 from the two-dimensional code scanned by the imaging unit 14, and transmits the acquired vehicle ID to the information management server 3. Moreover, for example, the control unit 15 periodically transmits, via the radio communication unit 13, the position information acquired from the positioning unit 12 to the information management server 3 together with the vehicle ID of the UADV 1. Incidentally, for example, the control unit 15 may also periodically transmit, via the radio communication unit 23, speed information indicating a flight speed of the UADV 1 to the information management server 3 together with the vehicle ID of the UADV 1.

Moreover, for example, every time a state is changed, the control unit 15 may transmit, via the radio communication unit 13, status information indicating a current state of the UADV 1 to the information management server 3 together with the vehicle ID of the UADV 1. The current state of the UADV 1 includes waiting, transporting, hovering, landing on a UGDV, returning, and the like. The state of waiting indicates a state in which the UADV 1 is waiting at a package loading place. The state of transporting indicates a state in which the UADV 1 is flying toward a delivery area for package transport. The state of hovering indicates a state in which the UADV 1 hovers in the air. The state of landing on a UGDV indicates a state in which the UADV 1 lands on the UGDV 2. The state of returning indicates a state in which the UADV 1 is flying toward the package loading place for returning.

[1-2. Outline of Configuration and Functions of UGDV 2]

Figure 4:
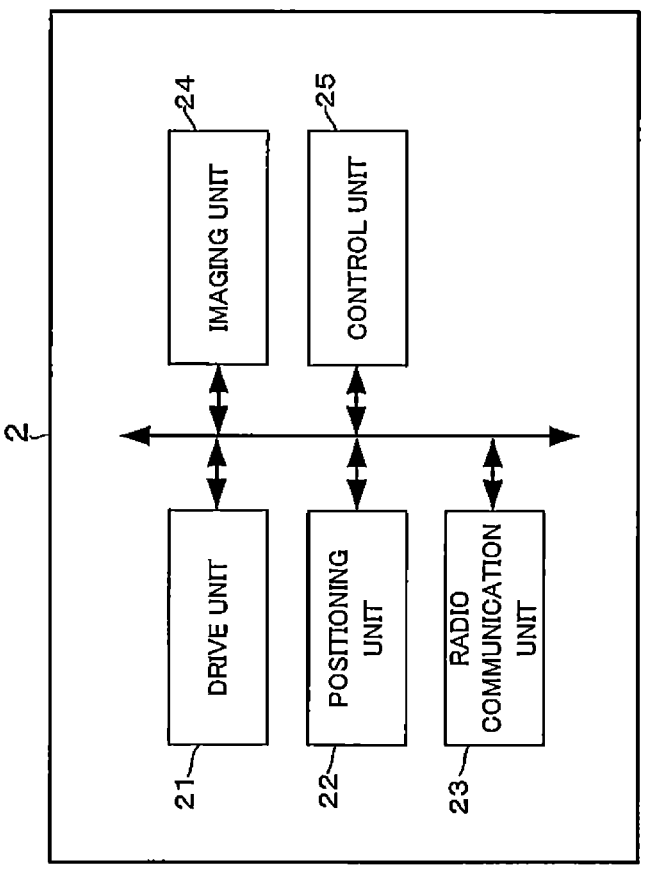
FIG. 4 is a diagram illustrating a schematic configuration example of an UGDV 2.

Next, an outline of a configuration and functions of a UGDV 2 will be described with reference to FIG. 4. FIG. 4 is a diagram illustrating a schematic configuration example of the UGDV 2. As illustrated in FIG. 4, the UGDV 2 includes a drive unit 21, a positioning unit 22, a radio communication unit 23, an imaging unit 24, a control unit 25, and the like. Incidentally, the UGDV 2 includes, although not illustrated, wheels, a weight sensor, a package receiving mechanism, a battery that supplies power to each of the units of the UGDV 2, and the like. Weight information indicating a weight value (weight) sensed by the weight sensor (that is, weight information of the package) is output to the control unit 25. The UGDV 2 may be capable of loading a plurality of packages.

The drive unit 21 includes a motor, a rotating shaft, and the like. The drive unit 21 rotates a plurality of wheels by a motor, a rotating shaft, and the like that are driven in accordance with a control signal output from the control unit 25. Incidentally, the drive unit 21 may include an engine driven by fuel together with the motor or instead of the motor. The positioning unit 22 includes a radio wave receiver and the like. For example, the positioning unit 22 receives, by the radio wave receiver, a radio wave sent from a satellite of a GNSS (Global Navigation Satellite System) and detects a current position in a horizontal direction (latitude and longitude) of the UGDV 2 on the basis of the radio wave. Incidentally, the current position in the horizontal direction of the UGDV 2 may be corrected on the basis of an image captured by the imaging unit 24. The position information indicating the current position detected by the positioning unit 22 is output to the control unit 25.

The radio communication unit 23 controls communication performed via the communication network NW. The imaging unit 24 includes a camera and the like. The imaging unit 24 continuously captures images of a real space within a range included in an angle of view of the camera (a periphery of the UGDV 2). Image information captured by the imaging unit 24 is output to the control unit 25. Moreover, in a case where authentication is performed before package transfer, a two-dimensional code displayed on the lower portion of the UADV 1 is scanned by the imaging unit 24 and output to the control unit 25. Alternatively, a two-dimensional code displayed on the lower portion of the package is scanned by the imaging unit 24 and output to the control unit 25.

The control unit 25 includes a CPU which is a processor, a ROM, a RAM, a non-volatile memory, and the like. Incidentally, the control unit 25 is an example of an acquisition unit. The control unit 25 executes various kinds of control for the UGDV 2 in accordance with a control program stored in, for example, the ROM or the non-volatile memory. The various kinds of control include movement control and package receiving control. In the movement control, the position information acquired from the positioning unit 22, the image information acquired from the imaging unit 24, port information acquired from the information management server 3, and the delivery destination information acquired from the information management server 3 or the like are used to control a rotation speed of the wheels, and a position and an advancing direction of the UGDV 2.

Here, the port information includes: a port ID of a port to be a transfer place of the package; and position information indicating an installation position of the port. By this configuration, the UGDV 2 can autonomously travel from the delivery vehicle parking place to the port and from the port to the delivery destination of the package. On the other hand, in the package receiving control, the UGDV 2 is set to a state capable of receiving the package by opening a package entrance provided at the upper portion of the UGDV 2, and control is performed to carry (that is, receive), in the UGDV 2, the package provided from the UADV 1. After the package is thus carried in, control is performed to close the package entrance.

In a case of determining that the package is received from the UADV 1, the control unit 25 preferably acquires delivery destination information of the package from the information management server 3, the UADV 1, or the package mounted on the UADV 1. For example, in a case where the weight of the package is sensed by the weight sensor, it is determined that the package is received. In a case where the delivery destination information of the package is acquired from the information management server 3, in the case of determining that the package is received from the UADV 1, the control unit 25 transmits, to the information management server 3, package receipt information indicating that the package is received. Then, the control unit 25 acquires the delivery destination information transmitted from the information management server 3 in response to the package receipt information.

Moreover, the control unit 25 may acquire the weight information of the package from the information management server 3 or the like before acquiring the delivery destination information of the package. In this case, the control unit 25 compares the weight information acquired from the information management server 3 or the like with the weight information acquired from the weight sensor, and in a case where a difference between the weight values indicated by the respective pieces of the weight information is equal to or less than a threshold (for example, equal to or less than an error range), the control unit 25 determines that the package is received.

Moreover, in a case where authentication is performed before the package transfer, the control unit 25 acquires the vehicle ID of the UADV 1 or the package ID of the package from the two-dimensional code scanned by the imaging unit 24, and transmits the acquired vehicle ID or package ID to the information management server 3. Moreover, for example, the control unit 25 periodically transmits, via the radio communication unit 23, the position information acquired from the positioning unit 22 to the information management server 3 together with the vehicle ID of the UGDV 2. Particularly, the control unit 25 preferably transmits, to the information management server 3 as the transfer position information, the position information indicating the current position detected by the positioning unit 22 when the UGDV 2 arrives and stops at the port that is to be the transfer place of the package.

Moreover, for example, every time a state is changed, the control unit 25 may transmit, via the radio communication unit 23, status information indicating the current state of the UGDV 2 to the information management server 3 together with the vehicle ID of the UGDV 2. The current state of UGDV 2 includes waiting, moving to a port, stopping at a port, delivering, returning, and the like. The state of waiting indicates a state in which the UGDV 2 is waiting at the delivery vehicle parking place. The state of moving to a port indicates a state in which the UGDV 2 is moving toward a port designated as a transfer place of the package. The state of stopping at a port indicates a state in which the UGDV 2 stops on a port designated as a transfer place of a package.

The state of delivering indicates a state in which the UGDV 2 is moving toward a delivery destination of the package in order to deliver the package. The state of returning indicates a state in which the UGDV 2 is moving toward the delivery vehicle parking place for returning.

[1-3. Outline of Configuration and Functions of Information Management Server 3]

Figure 5:
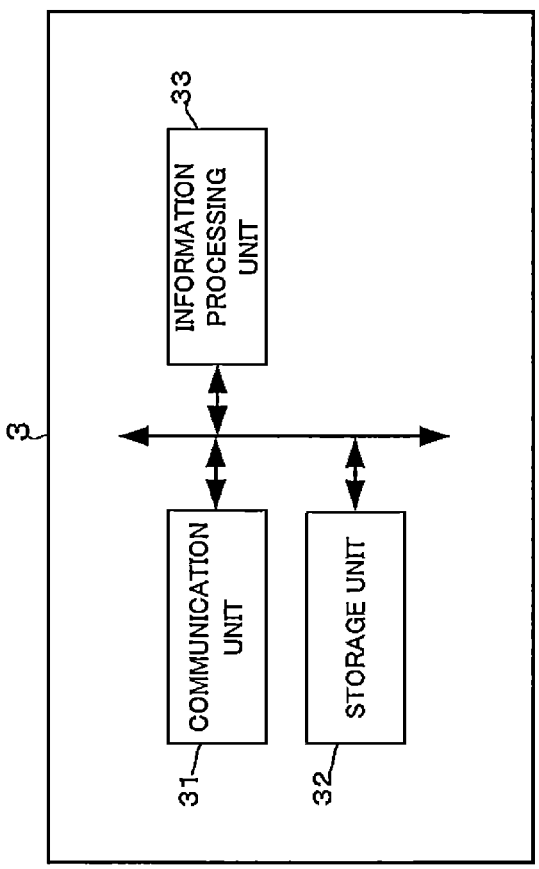
FIG. 5 is a diagram illustrating a schematic configuration example of an information management server 3.
Figure 6:
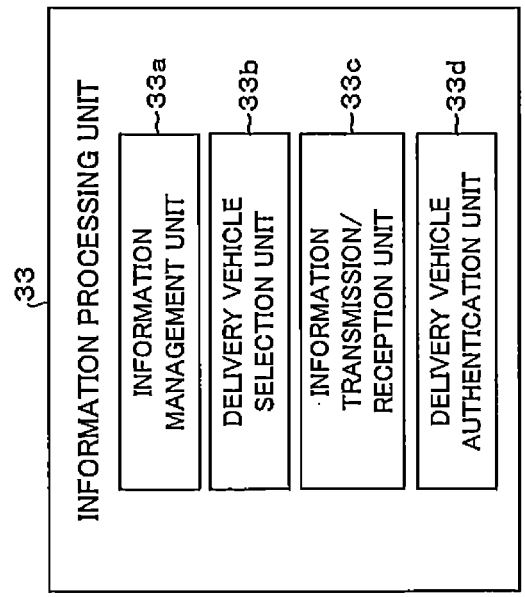
FIG. 6 is a diagram illustrating an example of functional blocks in an information processing unit 33.

Next, an outline of a configuration and functions of the information management server 3 will be described with reference to FIGS. 5 and 6. FIG. 5 is a diagram illustrating a schematic configuration example of the information management server 3. As illustrated in FIG. 5, the information management server 3 includes a communication unit 31, a storage unit 32, an information processing unit 33, and the like. The communication unit 31 controls communication performed via the communication network NW.

The storage unit 32 includes, for example, a hard disk drive and the like. For each of a plurality of ports, the storage unit 32 stores, in a manner correlated to each other, a port ID of a port, information of a delivery area where the port is installed, and position information indicating an installation position of the port. The information of the delivery area includes, for example, a name of the delivery area. Also, for each of a plurality of packages, the storage unit 32 stores a package ID of a package and delivery destination information of the package in a manner correlated to each other. Incidentally, in a case where a package is a product ordered by a purchaser, an order ID of the product and order information including delivery destination information of the product may be stored in a manner correlated to each other. Moreover, for each of the plurality of UADVs 1, the storage unit 32 stores a vehicle ID of a UADV 1, position information indicating a current position of the UADV 1, and status information indicating a current state of the UADV 1, in a manner correlated to each other.

Further, for each of a plurality of UGDVs 2, the storage unit 32 stores, in a manner correlated to each other, a vehicle ID of a UGDV 2, information of a delivery area where the UGDV 2 is disposed, load availability information of the UGDV 2, position information indicating a current position of the UGDV 2, and status information indicating a current state of the UGDV 2. The load availability information indicates whether or not the UGDV 2 is available for package loading. For example, load availability information of a UGDV 2 that loads the number of packages fewer than the maximum number of packages that can be loaded indicates that the UGDV 2 is available for loading. The load availability information may also include the number of packages that can be loaded at the current time point. The load availability information is updated when the UGDV 2 is assigned as a ground delivery means of a package, for example. Moreover, the position information indicating the current position and the status information indicating the current state of each of the UADV 1 and the UGDV 2 are successively updated by receiving information from the UADV 1 and the UGDV 2.

In a case where a building (for example, an apartment building or an office building) individually owns a UGDV 2, the UGDV 2 is the UGDV 2 exclusive for the building. Considering this case, the storage unit 32 may store exclusivity information in a manner correlated to the vehicle ID of the UGDV 2. The exclusivity information indicates whether or not the UGDV 2 is exclusive for a specific building, and in a case where the UGDV 2 is exclusive for the specific building, the exclusivity information includes a name and an address of the building.

The information processing unit 33 includes a CPU that is a processor, a ROM, a RAM, a non-volatile memory, and the like. FIG. 6 is a diagram illustrating an example of functional blocks in the information processing unit 33. As illustrated in FIG. 6, the information processing unit 33 functions as an information management unit 33a, a delivery vehicle selection unit 33b, an information transmission/reception unit 33c, and a delivery vehicle authentication unit 33d in accordance with a program stored in the ROM or the non-volatile memory, for example. Incidentally, the information processing unit 33 is an example of first to third information processing units. The delivery vehicle selection unit 33b is an example of a selection unit. The information transmission/reception unit 33c is an example of a transmission unit, first to fourth transmission units, and first to third reception units. The delivery vehicle authentication unit 33d is an example of first and second authentication units.

The information management unit 33a uses the storage unit 32 to manage, in a correlated manner, a package ID of a package, delivery destination information of the package, a vehicle ID of a UADV 1 that transports the package, a vehicle ID of a UGDV 2 that receives the package, and transfer position information indicating a position of the UGDV 2 that receives the package at the time of package transfer. That is, when the UADV 1 that transports the package is selected, the information management unit 33a first correlates the package ID and the delivery destination information of the package to the vehicle ID of the UADV 1 that transports the package. Next, when the UGDV 2 that receives the package is selected and assigned, the information management unit 33a correlates the ID and the delivery destination information of the package to the vehicle ID of the UGDV 2 that receives the package. Next, when the selected UGDV 2 arrives at, for example, a port to be a transfer place of the package, the information management unit 33a correlates the ID and the delivery destination information of the package to transfer position information indicating a position at the time of package transfer of the UGDV 2 that receives the package.

Here, in a case where the area of the port is equal to or smaller than the threshold (for example, in a case where only one UGDV 2 can stop at the port), when the port to be the transfer place of the package is determined by, for example, the information processing unit 33, the ID and the delivery destination information of the package may be correlated to the transfer position information indicating the position at the time of package transfer of the UGDV 2 that receives the package. Incidentally, the vehicle ID of the UADV 1 or the package ID of the package is managed as first ID (first identification information), and the vehicle ID of the UGDV 2 is managed as third ID (third identification information).

The delivery vehicle selection unit 33b selects one UGDV 2 available for use on the basis of, for example, the load availability information and the status information stored in the storage unit 32, from among a plurality of UGDVs 2 disposed in a delivery area of the package transported by the UADV 1. With this configuration, the one UGDV 2 available for use is assigned for the package as a ground delivery means for the package, and then used for package delivery. The one UGDV 2 available for use is, for example, a UGDV 2 that can load a package when the UGDV 2 is selected, and also is the UGDV 2 in the state of waiting or returning. However, even in a case where a UGDV 2 in the state of moving to a port or stopping at a port (UGDV 2 that already loads a different package), in a case where the UGDV 2 can further load a package and a port to which the UGDV 2 is advancing (or stopping at) is designated as the transfer place of the package, the UGDV 2 may be selected as one UGDV 2 available for use. According to this configuration, a plurality of UGDVs 2 can be efficiently used for package delivery.

Moreover, in a case where there is a plurality of UGDVs 2 available for use, the delivery vehicle selection unit 33*b* may preferentially select, from among the plurality of UGDVs 2 available for use, a UGDV 2 whose current position is located relatively close to the position of the port designated as the transfer place of the package (that is, the position at the time of package transfer). Moreover, in a case where the exclusivity information is stored in the storage unit 32, the delivery vehicle selection unit 33*b* may preferentially select, from among the plurality of UGDVs 2 available for use, a UGDV 2 exclusive for a building of a delivery destination of the package on the basis of the exclusivity information correlated to a vehicle ID of each UGDV 2. That is, the delivery vehicle selection unit 33*b* preferentially selects a UGDV 2 whose exclusivity information including a name and an address of the building of the delivery destination of the package.

Incidentally, in a case where delivery destinations of a plurality of packages transported by one or a plurality of UADVs 1 are included in a same delivery area, the delivery vehicle selection unit 33*b* preferably selects, on the basis of the load availability information stored in the storage unit 32, one UGDV 2 available for loading the plurality of packages. In this case, a package assigned to the UGDV 2, which is same as a package transported by a UADV 1 that first arrived at the delivery area, is preferably limited to a package transported by a UADV 1/UADVs 1 having arrived at the delivery area within a predetermined period from the arrival time of the UADV 1.

In a case where the predetermined condition based on position information of a UADV 1 that transports a package is satisfied, the information transmission/reception unit 33*c* transmits, to the UADV 1, transfer position information indicating a position at the time of package transfer of a UGDV 2 selected by the delivery vehicle selection unit 33*b*. For example, in a case where it is determined that the UADV 1 has arrived at the delivery area including the delivery destination of the package (arrival determination), the information transmission/reception unit 33*c* transmits the transfer position information to the UADV 1. Here, the transfer position information is transmitted from the UGDV 2 as described above or generated by the information processing unit 33 on the basis of the port information.

The above-described arrival determination may be made by the UADV 1 as described above or may be made by the information management server 3. In the former case, the information transmission/reception unit 33*c* transmits the transfer position information to the UADV 1 in response to the arrival information transmitted from the UADV 1 as described above. On the other hand, in the latter case, the information processing unit 33 makes arrival determination by determining whether or not a current position indicated by position information periodically transmitted from the UADV 1 has entered the delivery area. In the case where the current position enters the delivery area, the information transmission/reception unit 33*c* determines that the UADV 1 has arrived at the delivery area and transmits the transfer position information to the UADV 1.

Incidentally, a condition that the time has reached a predetermined period before scheduled arrival time of a UADV 1 at the delivery area may be set as the predetermined condition based on the position information of the UADV 1 as described above. In this case, the information transmission/reception unit 33*c* may transmit the transfer position information to the UADV 1 in a case of determining that the time has reached the predetermined period before the scheduled arrival time of the UADV 1 at the delivery area.

Moreover, the information transmission/reception unit 33*c* transmits delivery destination information of the package transported by the UADV 1 to the UGDV 2 selected by the delivery vehicle selection unit 33*b* (that is, the UGDV 2 whose position at the time of package transfer is identified by the UADV 1). For example, in a case of receiving the package receipt information from the UGDV 2, the information transmission/reception unit 33*c* preferably transmits the delivery destination information of the package to the UGDV 2 selected by the delivery vehicle selection unit 33*b*.

Incidentally, in a case of the delivery system S including one UADV 1 and one UGDV 2, the information transmission/reception unit 33*c* transmits the transfer position information of the one UGDV 2 to the one UADV 1 in a case where the predetermined condition based on the position information of the one UADV 1 is satisfied. In this case, the delivery vehicle selection unit 33*b* becomes unnecessary.

In a case where a vehicle ID of a UADV 1 or a package ID transmitted from a UGDV 2 is received as second ID (second identification information) by the information transmission/reception unit 33*c*, the delivery vehicle authentication unit 33*d* authenticates the UADV 1 or the package by using the first ID managed by the information management unit 33*a* and the second ID received by the information transmission/reception unit 33*c*. In this authentication, the delivery vehicle authentication unit 33*d* compares the first ID with the second ID, and in a case where the first ID coincides with the second ID, the delivery vehicle authentication unit 33*d* determines that the authentication is successful. Then, in the case where the authentication is determined as successful by the delivery vehicle authentication unit 33*d*, the information transmission/reception unit 33*c* transmits authentication success information to the UGDV 2. This authentication success information may also be control information that sets a UGDV 2 to a state capable of receiving a package.

Moreover, in a case where a vehicle ID of a UGDV 2 transmitted from a UADV 1 is received as fourth ID (fourth identification information) by the information transmission/reception unit 33*c*, the delivery vehicle authentication unit 33*d* authenticates the UGDV 2 by using the third ID managed by the information management unit 33*a* and the fourth ID received by the information transmission/reception unit 33*c*. In this authentication, the delivery vehicle authentication unit 33*d* compares the third ID with the fourth ID, and in a case where the third ID coincides with the fourth ID, the delivery vehicle authentication unit 33*d* determines that the authentication is successful. Then, in a case where the authentication is determined as successful by the delivery vehicle authentication unit 33*d*, the information transmission/reception unit 33*c* transmits the authentication success information to the UADV 1. This authentication success information may also be control information to provide a package to a UGDV 2.

[2. Operation of Delivery System S]

Figure 7:
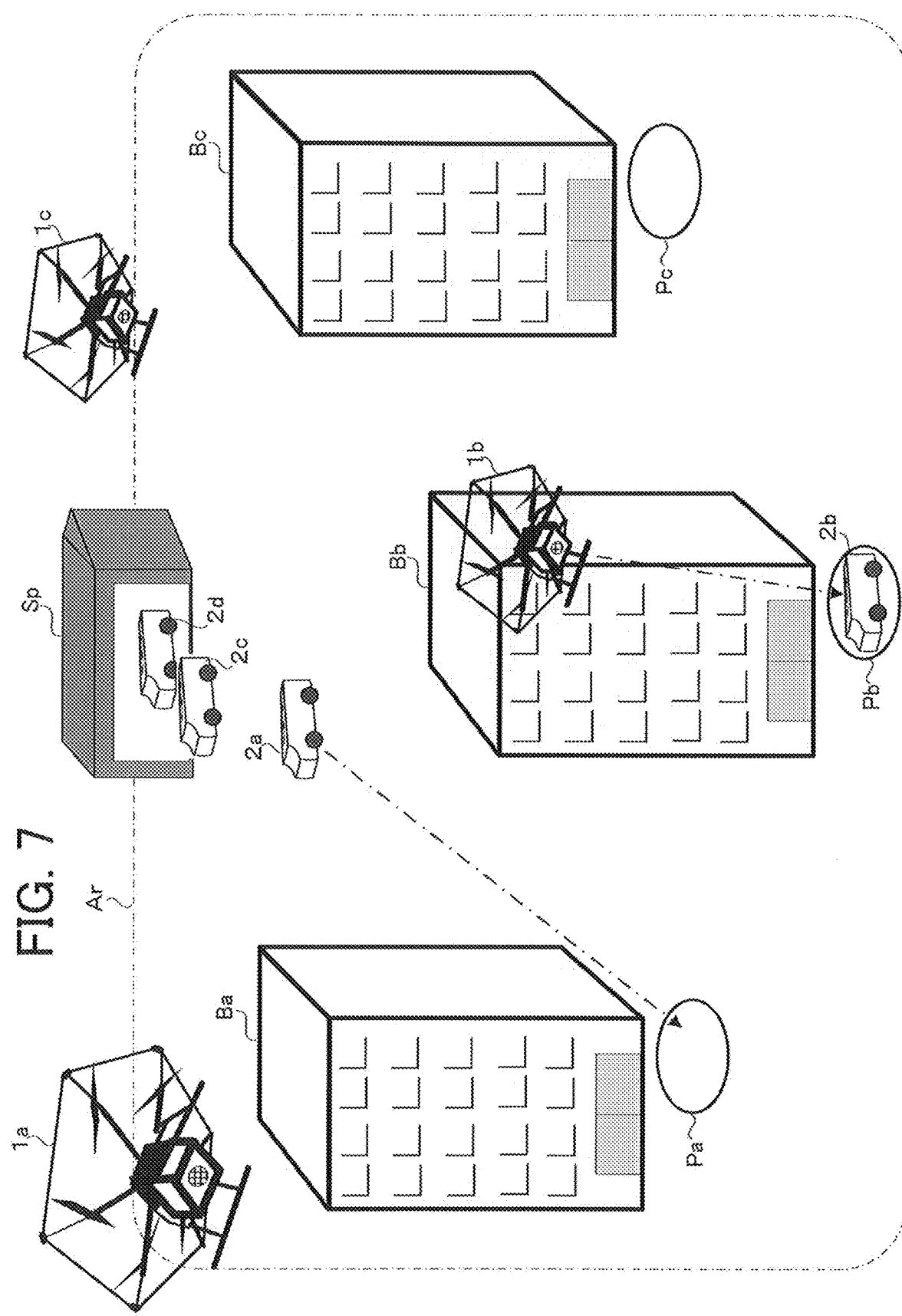
FIG. 7 is a conceptual diagram illustrating movements of UADVs 1 and UGDVs 2 in a delivery area Ar.
Figure 8:
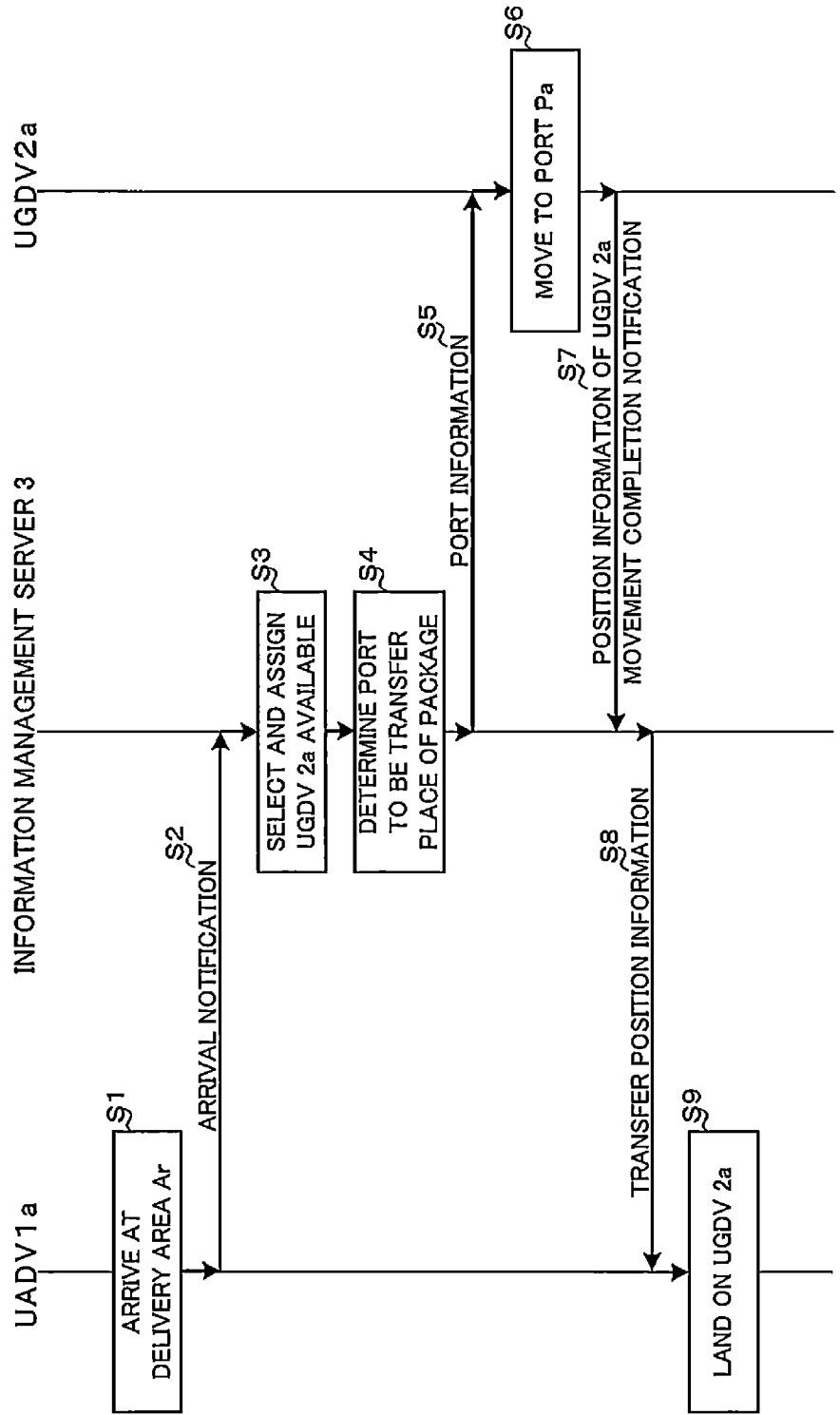
FIG. 8 is a sequence diagram illustrating an exemplary operation of a delivery system S from when an UADV 1 arrives at a delivery area Ar until the UADV 1 lands on an UGDV 2.

Next, an operation of the delivery system S according to the present embodiment will be described with reference to FIGS. 7 to 9. FIG. 7 is a conceptual diagram illustrating movements of UADVs 1 and UGDVs 2 in a delivery area Ar. FIG. 8 is a sequence diagram illustrating an exemplary operation of the delivery system S from when a UADV 1 arrives at the delivery area Ar until the UADV 1 lands on a UGDV 2. FIG. 9 is a sequence diagram illustrating an exemplary operation of the delivery system S from when the UADV 1 lands on the UGDV 2 until the UGDV 2 delivers a package to a delivery destination.

In the delivery area Ar illustrated in FIG. 7, there are three buildings Ba to Bc, and ports Pa to Pc are installed near the buildings Ba to Bc respectively. However, the respective ports Pa to Pc are the ports not exclusive for the respective buildings Ba to Bc. For example, even in a case where a delivery destination of a package is in the building Ba, there is a case where port Pb is determined as a transfer place of the package. Moreover, a delivery vehicle parking place Sp is installed in the delivery area Ar in order that UGDVs 2a to 2d capable of loading a plurality of packages may wait. The example of FIG. 7 illustrates a state immediately before a UADV 1a and a UADV 1c each of which transports a package arrive at the delivery area Ar and also illustrates a state when a UADV 1b which transports a package lands on the UGDV 2b that currently stops at the port Pb.

Incidentally, in the operation described below, in a case where the UADV 1a that transports the package arrives at the delivery area Ar, the UGDV 2a is assigned for the package and moves to the designated port Pa. However, even before the UADV 1a arrives at the delivery area Ar, in a case where a predetermined condition based on position information of the UADV 1a is satisfied, the UGDV 2a is assigned for the package and moves to the designated port Pa.

In FIG. 8, for example, when the UADV 1a arrives at the delivery area Ar including the delivery destination of the package (step S1), the UADV 1a transmits an arrival notification to the information management server 3 (step S2). This arrival notification is arrival information indicating that the vehicle has arrived at the delivery area Ar. Incidentally, as described above, arrival determination at the delivery area Ar is made by determining, for example, whether or not a current position of the UADV 1a has entered the delivery area Ar.

Next, when the arrival notification is received from the UADV 1a, the information management server 3 selects a UGDV 2a available for use from among the UGDVs 2a to 2d disposed in the delivery area Ar, and assigns the UGDV 2a for the package transported by the UADV 1a (step S3). That is, in a case where it is determined that the UADV 1a that transports the package has arrived at the delivery area Ar including the delivery destination of the package, the delivery vehicle selection unit 33b selects and assigns the UGDV 2a. Since the UGDV 2a is thus assigned immediately before package delivery, the UGDVs 2a to 2d can be more efficiently used for package delivery.

By the way, in a case where the UGDVs 2a, 2c, and 2d illustrated in FIG. 7 are available for use at the time of selection in step S3, the delivery vehicle selection unit 33b preferably selects, for example, the UGDV 2a whose current position is closest to the port Pa from among the UGDVs 2a, 2c, and 2d. According to this configuration, the UGDV 2a can deliver the package to the delivery destination more quickly. Alternatively, in this case, in a case where the UGDV 2a is, for example, exclusive for the building Ba that is the delivery destination of the package, the delivery vehicle selection unit 33b selects, from among the UGDV 2a, 2c, and 2d, the DGDV 2a exclusive for the building Ba that is the delivery destination of the package. According to this configuration, the UGDV 2a can deliver the package to the delivery destination more quickly, and a user of the building Ba can receive the package more quickly.

Incidentally, in the exemplary case illustrated in FIG. 7, the delivery destination of the package transported by the UADV 1a and a delivery destination of the package transported by the UADV 1c are in the same delivery area Ar, and the UADV 1c is scheduled to arrive at the delivery area Ar within a predetermined period from arrival time of the UADV 1a. In this case, in a case where the number of packages that can be loaded and indicated by load availability information correlated to a vehicle ID of the UGDV 2a is two or more in step S3, the delivery vehicle selection unit 33b preferably assigns the UGDV 2a for the package transported by the UADV 1a and the package transported by the UADV 1c. According to this configuration, battery power consumption or fuel consumption of the UGDV 2a can be reduced.

Next, the information management server 3 determines a port to be a transfer place of the package transported by the UADV 1a (step S4). For example, the port Pa closest to the delivery destination of the package is determined as the transfer place of the package. Next, the information management server 3 transmits port information of the port Pa determined in step S4 to the UGDV 2a assigned in step S3 (step S5).

Next, when the port information is received from the information management server 3, the UGDV 2a moves to the port Pa indicated by the port information under the movement control of the control unit 25 (step S6). Next, when the UGDV 2a arrives at the designated port Pa and stops on the port Pa, the UGDV 2a transmits the position information indicating the current position detected by the positioning unit 22 and a movement completion notification to the information management server 3 (step S7). This movement completion notification is movement completion information indicating that the movement to the port Pa is completed.

Next, when the position information and the movement completion notification are received from the UGDV 2a, the information management server 3 transmits the received position information to the UADV 1a as transfer position information indicating a position at the time of package transfer of the UGDV 2a that receives the package (step S8) When the transfer position information is received from the information management server 3, the UADV 1a identifies the position of the UGDV 2a at the time of package transfer on the basis of the transfer position information, and moves to the position indicated by the transfer position information under the flight control and the landing control of the control unit 15, and then lands on the UGDV 2a that currently stops on the port Pa (step S9).

Next, in FIG. 9, when the UADV 1a determines that the landing is completed, the UADV 1a transmits a landing notification to the information management server 3 (step S10). This landing notification is landing information indicating that the landing on the UGDV 2a is completed (landing completion). Next, when the landing notification is received from the UADV 1a, the information management server 3 transfers the landing notification to the UGDV 2a (step S11).

Next, when the landing notification is received from the information management server 3, the UGDV 2a acquires a vehicle ID or a package ID as the second ID by scanning, with the imaging unit 24, a two-dimensional code displayed on a lower portion of the UADV 1a or a lower portion of the package mounted on the UADV 1a (step S12). That is, in a case of receiving the landing notification from the information management server 3, the UGDV 2a acquires the second ID from the UADV 1a or the package. With this procedure, the two-dimensional code is scanned when the landing of the UGDV 2a is surely performed, and therefore, the second ID can be surely acquired. Next, the UGDV 2a transmits, to the information management server 3, the second ID acquired in step S12 and an authentication request (step S13).

Incidentally, in step S12, the UGDV 2a may determine landing completion of the UADV 1a and may acquire the second ID from the UADV 1a or the package. In this case, the landing notification from the information management server 3 is unnecessary. However, since there may be a case where the UADV 1a starts moving after the UGDV 2a determines the landing completion of the UADV 1a, it is desirable that the UGDV 2a explicitly obtains the landing completion. Moreover, since there may be a case where a definition of the landing completion is different depending on each UADV 1, it is desirable that the UGDV 2a explicitly obtains the landing completion. For example, there may be a case where a state in which the rotor (propeller) is stopped is defined as the landing completion, and also there may be a case where a state is defined as the landing completion even though the rotor is not stopped, depending on definitions of the landing completion. In the case where the state in which the rotor is stopped is defined as the landing completion, a state in which the rotor is still running is deemed as incomplete landing.

Next, when the second ID and the authentication request are received from the UGDV 2a, the information management server 3 authenticates the UADV 1a or the package mounted on the UADV 1a by using the first ID managed by the information management unit 33a and the received second ID in response to the authentication request (step S14). Next, the information management server 3 transmits an authentication result to the UGDV 2a (step S15). In a case where it is determined that the authentication is successful in the authentication in step S14, the authentication result to be transmitted to the UGDV 2a includes authentication success information indicating the success of authentication. This authentication success information may also be control information that sets a UGDV 2 to a state capable of receiving a package. On the other hand, in a case where it is determined in step S14 that the authentication is failed, an authentication result to be transmitted to the UGDV 2a includes authentication failure information indicating the failure of authentication.

Next, when the authentication result indicating the authentication success information is received from the information management server 3, the UGDV 2a is set to the state capable of receiving the package from the UADV 1a by opening a package entrance provided at an upper portion of the UGDV 2a under the package receiving control by the control unit 25 (step S16). When the state capable of receiving the package is thus set, the UGDV 2a transmits a preparation completion notification to the information management server 3 (step S17). This preparation completion notification is preparation completion information indicating that preparation for receiving the package is completed.

On the other hand, when the authentication result indicating the authentication failure information is received from the information management server 3, the UGDV 2a returns to, for example, the delivery vehicle parking place Sp without opening the package entrance provided at the upper portion of the UGDV 2a (that is, without receiving the package). At this time, the information management server 3 may transmit a return command to the UADV 1a. With this procedure, the UADV 1a returns to, for example, a package loading place in response to the return command from the information management server 3. Incidentally, in a case where the authentication result indicating the authentication failure information is received from the information management server 3, the UGDV 2a may transmit a confirmation notification to the information management server 3 instead of immediately returning. The confirmation notification is information indicating that the failure of authentication is confirmed. In this case, when the confirmation notification is received from the UGDV 2a, the information management server 3 transmits a return command to each of the UADV 1a and the UGDV 2a. With this procedure, each of the UADV 1a and the UGDV 2a returns in response to the return command from the information management server 3.

Next, when the preparation completion notification is received from the UGDV 2a, the information management server 3 transfers the preparation completion notification to the UADV 1a (step S18). Next, when the preparation completion notification is received from the information management server 3, the UADV 1a acquires a vehicle ID as the fourth ID by scanning, with the imaging unit 14, a two-dimensional code displayed on the upper portion of the UGDV 2a (step S19). Next, the UADV 1a transmits the fourth ID acquired in step S19 and an authentication request to the information management server 3 (step S20).

Next, when the fourth ID and the authentication request are received from the UADV 1a, the information management server 3 authenticates the UGDV 2a by using the third ID managed by the information management unit 33a and the received fourth ID in response to the authentication request (step S21). Next, the information management server 3 transmits an authentication result to the UADV 1a (step S22). In a case where it is determined that the authentication is successful in the authentication in step S21, the authentication result to be transmitted to the UADV 1a includes authentication success information indicating the success of authentication. This authentication success information may also be control information to provide a package to a UGDV 2. On the other hand, in a case where it is determined in step S21 that the authentication is failed, the authentication result to be transmitted to the UADV 1a includes authentication failure information indicating the failure of authentication.

Next, when the authentication result indicating the authentication success information is received from the information management server 3, the package held by the package holding mechanism is separated under the package providing control of the control unit 15, thereby the UADV 1a providing the package to the UGDV 2a (step S23). The UGDV 2a receives, from the package entrance, the package provided from the UADV 1a (step S24). Next, when the UADV 1a provides the package to the UGDV 2a, the UADV 1a transmits a package provision notification to the information management server 3 (step S25). This package provision notification is package provision information indicating that the package is provided. On the other hand, when package reception is determined by, for example, sensing the weight of the package with the weight sensor, the UGDV 2a transmits a package receipt notification to the information management server 3 (step S26). This package receipt notification is package receipt information indicating that the package is received.

On the other hand, when an authentication result indicating the authentication failure information is received from the information management server 3, the UADV 1a does not provide the package to the UGDV 2a and returns to, for example, the package loading place with the package mounted. At this time, the information management server 3 may transmit a return command to the UGDV 2*a*. With this procedure, the UGDV 2*a* closes the package entrance and returns to, for example, the delivery vehicle parking place Sp in response to the return command from the information management server 3. Incidentally, in a case where the authentication result indicating the authentication failure information is received from the information management server 3, the UADV 1*a* may transmit the confirmation notification to the information management server 3 instead of immediately returning. The confirmation notification is information indicating that the failure of authentication is confirmed. In this case, when the confirmation notification is received from the UADV 1*a*, the information management server 3 transmits a return command to each of the UADV 1*a* and the UGDV 2*a*. With this procedure, each of the UADV 1*a* and the UGDV 2*a* returns in response to the return command from the information management server 3.

Next, when the package provision notification is received from the UADV 1*a* and the package receipt notification is received from the UGDV 2*a*, the information management server 3 acquires a package ID (or a purchase order ID) correlated to the vehicle ID of the UADV 1*a*, and makes a search and acquires the delivery destination information of the package on the basis of the package ID (step S27). Next, the information management server 3 transmits, to the UGDV 2*a*, the delivery destination information acquired in step S27 (step S28). Thus, in a case where the authentication for the UADV 1*a* and the UGDV 2*a* is successful and the package receipt notification is received from the UGDV 2*a*, the information management server 3 transmits the delivery destination information of the package to the UGDV 2*a*. According to this configuration, it is possible to prevent the delivery destination information of the package from being carelessly provided to the outside, and safety in package delivery can be improved.

Next, when the delivery destination information of the package is received from the information management server 3, the UGDV 2*a* autonomously moves on the ground under the movement control of the control unit 25 on the basis of the delivery destination information, and delivers the package to the delivery destination (step S29). Thus, the package transported by UADV 1*a* is sent to the delivery destination by the UGDV 2*a*.

In the exemplary operation described above, in the case where authentication for the UADV 1*a* or the package is successful (step S14), the package entrance of the UGDV 2*a* is opened, and after that, in the case where the authentication of the UGDV 2*a* is successful (step S21), the package is separated. With this configuration, since the package is separated under the condition that both kinds of the above authentication are successful, it is possible to prevent the package from losing a place to go (in other words, prevent the package from being separated even when the package entrance of the UGDV 2*a* is not opened), and the safety in package delivery is further improved. However, the authentication for the UGDV 2*a* may be performed prior to the authentication for the UADV 1*a* or the package if the package can be prevented from losing a place to go by a different method. In this case, in a case where the authentication for the UGDV 2*a* is successful, the package is separated and placed at a predetermined position of the upper portion of the UGDV 2*a*, and after that, in a case where the authentication for the UADV 1*a* or the package authentication is successful, the package entrance of the UGDV 2*a* is opened and the package is carried in.

As described above, according to the above-described embodiment, in a case where a predetermined condition based on position information of a UADV 1 is satisfied, the UADV 1 acquires transfer position information indicating a position at the time of package transfer of a UGDV 2 that receives a package, and the UGDV 2 acquires delivery destination information of the package from the UADV 1, and therefore, the UADV 1 and the UGDV 2 are linked and the UADV 1 can quickly pass the package to the UGDV 2, and also the UGDV 2 can quickly deliver, to the delivery destination, the package that has been passed to the UGDV 2.

Incidentally, in the exemplary operation illustrated in FIG. 9, in the case where the landing notification is received from the information management server 3, the UGDV 2*a* may receive the package from the UADV 1*a* (for example, put the package on a roof of the UADV 1*a*) without performing authentication for the package or the UADV 1*a* that has landed and also without opening the package entrance. In this case, the authentication for the UADV 1*a* or the package is performed after the UGDV 2*a* has received the package. Then, in a case where the authentication for the UADV 1*a* or the package is successful, the UGDV 2*a* opens the package entrance to carry in the package and delivers the package, whereas in a case where the authentication for the UADV 1*a* or the package is failed, the UGDV 2*a* retracts the package without delivering the package. Alternatively, in the case where the landing notification is received from the information management server 3, the UGDV 2*a* may open the package entrance and receive the package from the UADV 1*a* without performing the authentication for the package or the UADV 1*a* that has landed. In this case, the authentication for the UADV 1*a* or the package is performed after the UGDV 2*a* has received the package. Then, in the case where the authentication for the UADV 1*a* or the package is successful, the UGDV 2*a* delivers the package, whereas in a case where the authentication for the UADV 1*a* or the package is failed, the UGDV 2*a* retracts the package without delivering the package.

Moreover, in the exemplary operation illustrated in FIG. 9, the UADV 1*a* and the UGDV 2*a* are authenticated by the information management server 3, but the authentication may be mutually performed between the UADV 1*a* and the UGDV 2*a*. In this case, in the case where the landing notification is received from the information management server 3, the UGDV 2*a* acquires the vehicle ID or the package ID as the second ID by scanning, with the imaging unit 24, the two-dimensional code displayed on the lower portion of the UADV 1*a* or the lower portion of the package mounted on the UADV 1*a*. Then, the UGDV 2*a* authenticates the UADV 1*a* or the package mounted on the UADV 1*a* by using the acquired second ID, and for example, the first ID acquired from the information management server 3. On the other hand, in the case where the preparation completion notification is received from the information management server 3, the UADV 1*a* acquires the vehicle ID as the fourth ID by scanning, with the imaging unit 14, the two-dimensional code displayed on the upper portion of the UGDV 2*a*. Then, the UADV 1*a* authenticates the UGDV 2*a* by using the acquired fourth ID, and for example, the third ID acquired from the information management server 3.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention. Moreover, the number N in an "Nth acquisition step" and an "Nth transmission step" described in the claims are independent from processing order and not necessarily intended to represent the processing order.

REFERENCE SIGNS LIST

1 UADV
2 UGDV
3 Information management server
11, 21 Drive unit
12, 22 Positioning unit
13, 23 Radio communication unit
14, 24 Imaging unit
15, 25 Control unit
31 Communication unit
32 Storage unit
33 Information processing unit
33a Information management unit
33b Delivery vehicle selection unit
33c Information transmission/reception unit
33d Delivery vehicle authentication unit
S Delivery system

The invention claimed is:

1. An automated delivery method executed by a delivery system including a first information processing unit executing on a processor, an unmanned aerial delivery vehicle, and a plurality of unmanned ground delivery vehicles, the delivery method comprising:
   entering, by the unmanned aerial delivery vehicle, a predefined delivery area within which a delivery destination of a package, transported by the unmanned aerial delivery vehicle at a time of entry to the delivery area, is located, each of the plurality of unmanned ground delivery vehicles being disposed within the delivery area;
   determining, by the unmanned aerial delivery vehicle, a current position of the unmanned aerial delivery vehicle, based on receipt, by a signal receiver of the unmanned aerial delivery vehicle, of a navigation signal;
   detecting, by one of the first information processing unit and a processor of the unmanned aerial delivery vehicle, an arrival of the unmanned aerial delivery vehicle to the delivery area, based on the current position of the unmanned aerial delivery vehicle;
   selecting, by the first information processing unit, an unmanned ground delivery vehicle available for use from among the plurality of unmanned ground delivery vehicles;
   automatically acquiring, by the unmanned aerial delivery vehicle, a transfer position at which the package is to be transferred from the unmanned aerial delivery vehicle to the selected unmanned ground delivery vehicle, the acquisition of the transfer position being responsive to detecting the arrival by the unmanned aerial delivery vehicle to the delivery area;
   autonomously moving, by the unmanned aerial delivery vehicle, to the acquired transfer position according to a flight control program executing on the processor of the unmanned aerial delivery vehicle;
   transferring the package, by the unmanned aerial delivery vehicle, to the selected unmanned ground delivery vehicle at the acquired transfer position; and
   acquiring, by the selected unmanned ground delivery vehicle, the delivery destination for the package, the acquisition of the delivery destination being responsive to receipt by the selected unmanned ground delivery vehicle of the package from the unmanned aerial delivery vehicle,
   wherein, based on a presence of another unmanned aerial delivery vehicle that is scheduled to arrive in the delivery area within a predetermined period of time from a time of the arrival by the unmanned aerial delivery vehicle to the delivery area, a same unmanned ground delivery vehicle is selected from the plurality of unmanned ground delivery vehicles disposed within the delivery area for both the unmanned aerial delivery vehicle and the another unmanned aerial delivery vehicle, the delivery area including both the delivery destination of the package transported by the unmanned aerial delivery vehicle and a second delivery destination of a second package transported by the another unmanned aerial delivery vehicle, the second delivery destination being separate from the delivery destination of the package transported by the unmanned aerial delivery vehicle, the second package transported transferred by the another unmanned aerial delivery vehicle to the selected unmanned ground delivery vehicle.

2. The delivery method according to claim 1, further comprising delivering the package to the delivery destination by the selected unmanned ground delivery vehicle autonomously moving based on the delivery destination of the package according to a movement control program executing on a processor of the unmanned ground delivery vehicle.

3. The delivery method according to claim 1, wherein:
   the first information processing unit is configured to manage transfer position information indicating the transfer position, and
   the acquisition of the transfer position by the unmanned aerial delivery vehicle is based on transmitting, by the first information processing unit, the transfer position information to the unmanned aerial delivery vehicle.

4. The delivery method according to claim 1, wherein the selected unmanned ground delivery vehicle determines that the package is received responsive to sensing a weight of the package.

5. The delivery method according to claim 1, wherein
   the delivery system further includes a second information processing unit executing on a processor and configured to manage delivery destination information indicating the delivery destination of the package, and
   the acquisition of the delivery destination by the selected unmanned ground delivery vehicle includes transmitting, by the second information processing unit, the delivery destination information of the package to the selected unmanned ground delivery vehicle.

6. The delivery method according to claim 5, wherein the acquisition of the delivery destination information by the selected unmanned ground delivery vehicle further includes transmitting, to the second information processing unit, package receipt information indicating that the package is received by the selected unmanned ground delivery vehicle from the unmanned aerial delivery vehicle, the transmission by the second information processing unit of the delivery destination information being responsive to receipt of the package receipt information.

7. The delivery method according to claim 1, wherein the selected unmanned ground delivery vehicle acquires the delivery destination of the package from at least one of the unmanned aerial delivery vehicle and the package.

8. The delivery method according to claim 1, wherein the delivery system further includes a third information processing unit executing on a processor and configured to manage, as first identification information, at least one of identification information of the unmanned aerial delivery vehicle and identification information of the package mounted on the unmanned aerial delivery vehicle, the delivery method further comprising:

acquiring, by the selected unmanned ground delivery vehicle, second identification information from at least one of the unmanned aerial delivery vehicle having landed on the selected unmanned ground delivery vehicle and the package mounted on the unmanned aerial delivery vehicle;

transmitting the acquired second identification information to the third information processing unit by the selected unmanned ground delivery vehicle;

authenticating at least one of the unmanned aerial delivery vehicle and the package by using the first identification information and the second identification information;

transmitting authentication success information to the selected unmanned ground delivery vehicle responsive to the third information processing unit determining that authentication is successful in authenticating the at least one of the unmanned aerial delivery vehicle and the package; and setting the selected unmanned ground delivery vehicle to a state capable of receiving the package from the unmanned aerial delivery vehicle responsive to the selected unmanned ground delivery vehicle receiving the authentication success information from the third information processing unit.

9. The delivery method according to claim 8, wherein the third information processing unit further manages, as third identification information, identification information of the selected unmanned ground delivery vehicle, the delivery method further comprising:

transmitting preparation completion information from the selected unmanned ground delivery vehicle to the third information processing unit responsive to the selected unmanned ground delivery vehicle being set to the state capable of receiving the package;

transmitting, to the unmanned aerial delivery vehicle, the preparation completion information received by the third information processing unit;

acquiring, by the unmanned aerial delivery vehicle, fourth identification information from the selected unmanned ground delivery vehicle on which the unmanned aerial delivery vehicle has landed responsive to the unmanned aerial delivery vehicle receiving the preparation completion information from the third information processing unit;

transmitting the acquired fourth identification information to the third information processing unit by the unmanned aerial delivery vehicle;

authenticating the selected unmanned ground delivery vehicle based on the third identification information and the fourth identification information;

transmitting the authentication success information to the unmanned aerial delivery vehicle responsive to the third information processing unit determining that authentication is successful in authenticating the selected unmanned ground delivery vehicle; and providing the package to the selected unmanned ground delivery vehicle by the unmanned aerial delivery vehicle responsive to the unmanned aerial delivery vehicle receiving the authentication success information from the third information processing unit.

10. The delivery method according to claim 8, wherein the third information processing unit further manages, as third identification information, identification information of the selected unmanned ground delivery vehicle, the delivery method further comprising:

acquiring, by the unmanned aerial delivery vehicle, fourth identification information from the selected unmanned ground delivery vehicle on which the unmanned aerial delivery vehicle has landed;

transmitting the acquired fourth identification information to the third information processing unit by the unmanned aerial delivery vehicle;

authenticating the selected unmanned ground delivery vehicle based on the third identification information and the fourth identification information;

transmitting the authentication success information to the unmanned aerial delivery vehicle responsive to the third information processing unit determining that authentication is successful in authenticating the selected unmanned ground delivery vehicle; and setting the unmanned aerial delivery vehicle to a state capable of providing the package to the selected unmanned ground delivery vehicle responsive to the unmanned aerial delivery vehicle receiving the authentication success information from the third information processing unit.

11. The delivery method according to claim 8, further comprising:

receiving landing information by the third information processing unit from the unmanned aerial delivery vehicle that has landed on the selected unmanned ground delivery vehicle, the landing information indicating that the unmanned aerial delivery vehicle has landed; and transmitting the landing information to the selected unmanned ground delivery vehicle by the third information processing unit, wherein, responsive to the selected unmanned ground delivery vehicle receiving the landing information from the third information processing unit, the selected unmanned ground delivery vehicle acquires the second identification information from at least one of the unmanned aerial delivery vehicle and the package.

12. The delivery method according to claim 1, wherein the selected unmanned ground delivery vehicle is placed in a predetermined delivery vehicle parking place, the delivery method further comprising moving the selected unmanned ground delivery vehicle to the transfer position responsive to the arrival of the unmanned aerial delivery vehicle to the delivery area.

13. An information processing device in an automated delivery system including an unmanned aerial delivery vehicle, a plurality of unmanned ground delivery vehicles disposed within a predefined delivery area, and the information processing device, the information processing device comprising:

at least one memory configured to store program code; and at least one processor configured to access the program code and operate as instructed by the program code, the program code including:

condition code configured to cause at least one of the at least one processor to, while the unmanned aerial delivery vehicle is transporting a package having a delivery destination located within the delivery area, detect an arrival of the unmanned aerial delivery vehicle to the delivery area, based on a current position of the unmanned aerial delivery vehicle, the current position determined based on a navigation signal received by the unmanned aerial delivery vehicle, each of the plurality of unmanned ground delivery vehicles being disposed within the delivery area;

selection code configured to cause at least one of the at least one processor to, based on detecting the arrival of the unmanned aerial delivery vehicle to the delivery area, select an unmanned ground delivery vehicle available for use from among the plurality of unmanned ground delivery vehicles;

first transmission code configured to cause at least one of the at least one processor to automatically transmit, to the unmanned aerial delivery vehicle, transfer position information indicating a transfer position at which the package transported by the unmanned aerial delivery vehicle is to be transferred to the selected unmanned ground delivery vehicle, the transmission being responsive to detecting the arrival by the unmanned aerial delivery vehicle to the predefined delivery area, the unmanned aerial delivery vehicle thereby controlled to autonomously move to the transfer position according to a flight control program executing on a processor of the unmanned aerial delivery vehicle; and second transmission code configured to cause at least one of the at least one processor to transmit, to the selected unmanned ground delivery vehicle, delivery destination information from the unmanned aerial delivery vehicle indicating the delivery destination for the package, the transmission being responsive to receipt by the selected unmanned ground delivery vehicle of the package from the unmanned aerial delivery vehicle, wherein, based on a presence of another unmanned aerial delivery vehicle that is scheduled to arrive in the delivery area within a predetermined period of time from a time of the arrival by the unmanned aerial delivery vehicle to the delivery area, a same unmanned ground delivery vehicle is selected from the plurality of unmanned ground delivery vehicles disposed within the delivery area for both the unmanned aerial delivery vehicle and the another unmanned aerial delivery vehicle, the delivery area including both the delivery destination of the package transported by the unmanned aerial delivery vehicle and a second delivery destination of a second package transported by the another unmanned aerial delivery vehicle, the second delivery destination being separate from the delivery destination of the package transported by the unmanned aerial delivery vehicle, the second package transported transferred by the another unmanned aerial delivery vehicle to the selected unmanned ground delivery vehicle.

14. An automated delivery method executed by a delivery system including an information processing unit executing on a processor, a plurality of unmanned aerial delivery vehicles, and a plurality of unmanned ground delivery vehicles, the delivery method comprising:

determining, by a first unmanned aerial delivery vehicle, a current position of the first unmanned aerial delivery vehicle, based on receipt, by a signal receiver of the first unmanned aerial delivery vehicle, of a navigation signal;

detecting, by one of the information processing unit and a processor of the first unmanned aerial delivery vehicle, an arrival of the first unmanned aerial delivery vehicle to a delivery area, based on the current position of the first unmanned aerial delivery vehicle, the delivery area including a first delivery destination of a first package transported by the first unmanned aerial delivery vehicle, each of the plurality of unmanned ground delivery vehicles being disposed within the delivery area, each of the plurality of unmanned ground delivery vehicles being disposed within the delivery area;

selecting an unmanned ground delivery vehicle from the plurality of unmanned ground delivery vehicles disposed within the delivery area in response to detecting the arrival of the first unmanned aerial delivery vehicle to the delivery area;

automatically acquiring, by the first unmanned aerial delivery vehicle, a transfer position where the first package is to be transferred from the first unmanned aerial delivery vehicle to the selected unmanned ground delivery vehicle, based on a location information of the first delivery destination, the acquisition of the transfer position being responsive to detecting the arrival by the first unmanned aerial delivery vehicle to the delivery area;

autonomously moving, by the first unmanned aerial delivery vehicle, toward the acquired transfer position according to a flight control program executing on the processor of the first unmanned aerial delivery vehicle;

autonomously moving, by the selected unmanned ground delivery vehicle, toward the acquired transfer position according to a movement control program executing on a processor of the selected unmanned ground delivery vehicle;

transmitting, to the first unmanned aerial delivery vehicle and the selected unmanned ground delivery vehicle, control information to transfer the first package from the first unmanned aerial delivery vehicle to the selected unmanned ground delivery vehicle, at the transfer position;

when acquiring schedule information indicating that a second unmanned aerial delivery vehicle, which transports a second package having a second delivery destination included in the delivery area and separate from the first delivery destination, is scheduled to arrive in the delivery area within a predetermined period of time from a time of the arrival by the first unmanned aerial delivery vehicle to the delivery area:

selecting the selected unmanned ground delivery vehicle as an unmanned ground delivery vehicle which transfers the second package from the second unmanned aerial delivery vehicle, having the second unmanned aerial delivery vehicle move toward the transfer position, and transmitting, to the second unmanned aerial delivery vehicle and the selected unmanned ground delivery vehicle, control information to transfer the second package from the second unmanned aerial delivery vehicle to the selected unmanned ground delivery vehicle, at the transfer position;

automatically acquiring the location information of the first delivery destination, by the selected unmanned ground delivery vehicle, the acquisition of the location information being responsive to a sensor provided in the selected unmanned ground delivery vehicle detecting that the selected unmanned ground delivery vehicle has received the first package; and autonomously moving, by the selected unmanned ground delivery vehicle, to the first delivery destination based on the location information of the first delivery destination which is acquired, according to the movement control program executing on the processor of the selected unmanned ground delivery vehicle.

\* \* \* \* \*